(12) United States Patent
Sano

(10) Patent No.: US 8,992,668 B2
(45) Date of Patent: Mar. 31, 2015

(54) GAS SEPARATION MEMBRANE AND METHOD FOR PRODUCING THE SAME, AND METHOD FOR SEPARATING GAS MIXTURE, GAS SEPARATION MEMBRANE MODULE AND GAS SEPARATION APPARATUS USING THE SAME

(75) Inventor: Satoshi Sano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 149 days.

(21) Appl. No.: 13/637,803

(22) PCT Filed: Mar. 28, 2011

(86) PCT No.: PCT/JP2011/057695
§ 371 (c)(1),
(2), (4) Date: Sep. 27, 2012

(87) PCT Pub. No.: WO2011/122581
PCT Pub. Date: Oct. 6, 2011

(65) Prior Publication Data
US 2013/0014642 A1   Jan. 17, 2013

(30) Foreign Application Priority Data

Mar. 29, 2010   (JP) .................................. 2010-076450

(51) Int. Cl.
| | | |
|---|---|---|
| B01D 53/22 | (2006.01) | |
| C08F 212/14 | (2006.01) | |
| B01D 71/38 | (2006.01) | |
| B01D 71/52 | (2006.01) | |
| B01D 71/82 | (2006.01) | |
| C08F 220/06 | (2006.01) | |

(52) U.S. Cl.
CPC ............ *C08F 212/14* (2013.01); *B01D 53/228* (2013.01); *B01D 71/38* (2013.01); *B01D 71/52* (2013.01); *B01D 71/82* (2013.01); *B01D 2323/30* (2013.01); *C08F 220/06* (2013.01)
USPC ...................... 95/45; 95/51; 95/49; 96/4; 96/5

(58) Field of Classification Search
CPC ....... B01D 53/228; B01D 53/22; Y02C 10/10
USPC ..................... 95/45, 49, 51; 96/4, 5
See application file for complete search history.

(56) References Cited

U.S. PATENT DOCUMENTS

| | | | | |
|---|---|---|---|---|
| 4,714,482 A * | 12/1987 | Polak et al. ......................... 96/4 | | |
| 5,269,931 A * | 12/1993 | Hu et al. ...................... 210/635 | | |
| 5,277,812 A * | 1/1994 | Hu et al. ................... 210/500.41 | | |
| 5,409,525 A * | 4/1995 | Kazama et al. .................... 96/14 | | |
| 5,445,669 A | 8/1995 | Nakabayashi et al. | | |
| 5,531,893 A * | 7/1996 | Hu et al. ................... 210/500.35 | | |
| 6,635,103 B2 * | 10/2003 | Sirkar et al. ....................... 95/44 | | |
| 7,318,854 B2 * | 1/2008 | Sirkar .............................. 95/45 | | |
| 7,670,509 B2 * | 3/2010 | Jin et al. ......................... 252/500 | | |
| 7,923,166 B2 * | 4/2011 | Fukuta et al. ................. 429/492 | | |
| 8,691,918 B2 * | 4/2014 | Jaber et al. ................. 525/328.2 | | |
| 2003/0033932 A1 * | 2/2003 | Sirkar et al. ....................... 95/51 | | |
| 2006/0090644 A1 * | 5/2006 | Sirkar .............................. 95/45 | | |
| 2007/0197708 A1 * | 8/2007 | Jin et al. ......................... 524/439 | | |
| 2009/0156875 A1 | 6/2009 | Tomioka et al. | | |
| 2009/0266764 A1 * | 10/2009 | Kawakatsu ................... 210/653 | | |
| 2012/0297976 A1 * | 11/2012 | Sano ................................ 95/47 | | |

FOREIGN PATENT DOCUMENTS

| | | | |
|---|---|---|---|
| JP | 07-112122 A | 5/1995 | |
| JP | 07-275672 A | 10/1995 | |
| JP | 08-193156 A | 7/1996 | |
| JP | 2001-120940 A | 5/2001 | |
| JP | 2006-297335 A | 11/2006 | |
| JP | 2007-297605 A | 11/2007 | |
| JP | 2008-036463 A | 2/2008 | |
| JP | 2008-036464 A | 2/2008 | |
| JP | 2009-141006 A | 6/2009 | |
| JP | 2009-185118 A | 8/2009 | |
| JP | 2009-195900 A | 9/2009 | |

OTHER PUBLICATIONS

Okada et al. Translation of JP 2008-036463 Feb. 21, 2008.*
Office Action, dated Dec. 24, 2013, issued by the Japanese Patent Office in counterpart Japanese Application No. 2011-070946.
International Search Report, dated May 17, 2011, issued by the International Searching Authority in counterpart International Application No. PCT/JP2011/057695 (PCT/ISA/210).
Written Opinion, dated May 17, 2011, issued by the International Searching Authority in counterpart International Application No. PCT/JP2011/057695 (PCT/ISA/237).
Lin et al.; "Plasticization Enhances Hydrogen Purification Using Polymeric Membranes"; *Science*, vol. 311, pp. 639-642; Feb. 2006.
Teramoto, Masaaki; "Recent Developments in Gas Separations by Facilitated Transport Membranes with High Selectivity" *Membrane*, vol. 29 No. 4, 194-201, 2004.

\* cited by examiner

*Primary Examiner* — Jason M Greene
*Assistant Examiner* — Anthony Shumate
(74) *Attorney, Agent, or Firm* — Sughrue Mion, PLLC

(57) ABSTRACT

A gas separation membrane including, a separation-active membrane containing: a compound represented by the following Formula (I) having a boiling point or a decomposition temperature of 200° C. or higher; and a cross-linked polymer containing a dissociable group and a repeating unit derived from alkylene glycol:

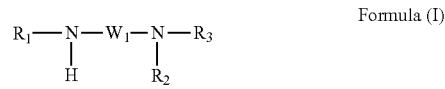

Formula (I)

wherein, in Formula (I), $R_1$, $R_2$ and $R_3$ represent a hydrogen atom or a substituent; $W_i$ represents a bivalent linking group; when $R_1$, $R_2$ and $R_3$ represent a substituent, $R_1$ and $R_2$, $R_1$ and $R_3$ or $R_2$ and $R_3$ may be combined together to form a ring and wherein, in the compound represented by Formula (I), [total molecular weight of primary amine group+total molecular weight of secondary amine group]/[molecular weight of Formula (I)] is from 0.3 to 0.84.

15 Claims, No Drawings

GAS SEPARATION MEMBRANE AND METHOD FOR PRODUCING THE SAME, AND METHOD FOR SEPARATING GAS MIXTURE, GAS SEPARATION MEMBRANE MODULE AND GAS SEPARATION APPARATUS USING THE SAME

TECHNICAL FIELD

The present invention relates to a novel gas separation membrane capable of efficiently separating a specific acid gas from a gas mixture containing gas such as hydrogen, helium, carbon monoxide, carbon dioxide, hydrogen sulfide, oxygen, nitrogen, ammonia, sulfur oxide, nitrogen oxide, hydrocarbon such as methane, ethane and propane, unsaturated hydrocarbon such as propylene, and a perfluoro compound such as tetrafluoroethane, particularly, a gas separation membrane which selectively separates carbon dioxide from a gas mixture containing carbon dioxide, a method for producing the same, and a module and a separation apparatus using the same.

BACKGROUND ART

Conventionally, it was known that gas component can be separated through membranes made of polymer materials, since the polymer materials have an inherent gas permeability thereof. Recently, regarding environmental problem of global warming, such a membrane is suggested as a means for separating and recovering carbon dioxide from bulk carbon dioxide sources such as thermal power stations or cement plants, blast furnaces in steel mill and the like, while reducing energy. Meanwhile, natural gas or bio gas (gases generated by fermentation and anaerobic digestion of excreta of organisms, organic fertilizers, biodegradable substances, polluted water, garbages, energy crops, and the like) is mainly a mixed gas of methane and carbon dioxide, and hydrogen is generally prepared via modification of natural gas with water vapor and water gas shift. In this process, a gas mixture containing about 25% of carbon dioxide and about 75% of hydrogen is obtained. When a method is capable of selectively permeating or removing carbon dioxide as impurity with a low concentration, the method may be considered to be economically excellent as a separation and purification method. Therefore, membrane separation methods have been researched as means for removing impurities (For example, see Patent document 1 and Patent document 2).

However, permeability (permeability coefficient) of gas in a polymer membrane is expressed by a product of gas solubility coefficient (solubility) and gas diffusion coefficient (diffusion property) in the polymer membrane (See, for example non-patent Document 1). For this reason, in order to selectively improve permeability (permeability coefficient) of carbon dioxide with respect to a separated gas, solubility coefficient (solubility) and/or diffusion coefficient (diffusion property) of carbon dioxide in polymer membranes are selectively improved. General polymer membranes are however known to have a problem of trade-off relation in which as selectivity increases, permeability decreases. In an attempt to overcome this trade-off of polymer membrane, a separation membrane, called "liquid membrane" or "facilitated transport membrane" is suggested.

The facilitated transport membrane is a membrane in which a substance (carrier) that selectively reacts with only a specific permeation material is incorporated, which is also called "carrier transport membrane". The permeation material can be permeated by a dissolution and diffusion mechanism through a membrane matrix as well as a formation of a reaction product with the carrier, and thus it is obtained a high permeation selectiveity as compared to a co-existing gas other than permeation materials capable of being permeated by the dissolution and diffusion mechanism (see, for example, Non-patent Document 2). For example, in carbon dioxide/hydrogen separation, conventional polymer membranes have separation selectivity of about several tens (see, for example Non-patent Document 3). However, it is disclosed an example of the facilitated transport membranes having separation selectivity of 100 or higher (see, for example, Patent Documents 3 to 6). In addition, a separation-active membrane using an amine compound fixed on a polymer (see Patent Document 7), and a gas-selective permeability film using a resin composition including a reaction mixture between polyacrylic acid and aliphatic amine (see Patent Document 8) are disclosed.

RELATED ART

Patent Document

Patent Document 1: JP-A-2007-297605
Patent Document 2: JP-A-2006-297335
Patent Document 3: JP-A-2008-36463
Patent Document 4: JP-A-2008-36464
Patent Document 5: JP-A-2009-195900
Patent Document 6: JP-A-2009-185118
Patent Document 7: JP-A-2009-141006
Patent Document 8: JP-A-8-193156

Non-Patent Document

[Non-patent Document 1] "High technologies of gas separation membrane•permeation membrane•barrier membrane", pp 52-59, edited by Nagai Kazukiyo and issued by CMC.
[Non-patent Document 2] Membrane, 2004, 29(4) 194-201.
[Non-patent Document 3] Science, 2006, 311, 639-642.

DISCLOSURE OF INVENTION

Problems to be Solved by Invention

As described above, in natural gas, bio gas and hydrogen preparation plants, separation of acid gas, in particular, carbon dioxide, as an impurity is required.

As a result of research of the present inventors, it was confirmed that a cross-linked polyethylene glycol membrane containing a specific amine dendrimer as described in Patent Document 6 is a flexible rubber-type single membrane, which is readily cracked when being peeled off and should be drawn attention during handling and requires mechanical strength. In addition, Patent Documents 3 to 5 use hydrophilic microfiltration membranes (microfilters) as support membranes and it satisfies mechanical strength, high gas permeability and separation selevtivity due to filling, in holes, and forming a gel membrane made of cross linked polyalcohol. However, as a result of research of the present inventors, since the polyvinyl alcohol is used as a material, dried membranes are hard but weak for impact or bending, and thereby are cracked in some cases.

Patent Documents 7 and 8 disclose fixation of an amine compound on a polymer and exhibit insufficient acid gas permeability and separation selectivity of gas under high temperature conditions.

In order to feed a great amount of acid gas to membranes and promote dissolution-diffusion, the concentration of carrier, that is, concentration of amine, in the membranes, is desirably high. However, when a membrane material containing a high concentration of amine is cured by UV irradiation to form a membrane, excess amine acts as a curing inhibitor, and thereby it is caused considerable deterioration in membrane-forming property. In addition, formation of membrane by a heat curing method may cause coloring due to oxidation of amine or determination in performance. For this reason, it is difficult to store a high concentration of amine in the membrane. Accordingly, as a result of repeated research, the present inventors discovered that a carrier in which a reaction site density with acid gas per unit molecular weight is high can be fixed on the polymer (supported on the membrane) in the membrane by previously introducing an acid ingredient into a membrane material, imparting a membrane-forming property thereto and reacting a specific valent of amine as a post-process and thereby a gas separation membrane that exhibits superior separation selectivity even at a high temperature and at a high pressure is obtained. The present invention was completed based on these discoveries.

It is an object of the present invention to solve these problems, based on this configuration and provide a gas separation membrane with superior gas permeability, separation selectivity and heat resistance, a method for producing the gas separation membrane, a method for separating a gas mixture, and a gas separation membrane module and a gas separation apparatus using the same.

Means for Solving the Problems

That is, the present invention is accomplished by the following means.

[1] A gas separation membrane having a separation-active membrane containing a compound represented by the following Formula (I) having a boiling point or a decomposition temperature of 200° C. or higher and a cross-linked polymer having a dissociable group and repeat units derived from alkylene glycol:

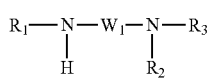

Formula (I)

(wherein in Formula (I), $R_1$, $R_2$ and $R_3$ represent a hydrogen atom or a substituent and $W_1$ represents a bivalent linking group, when $R_1$, $R_2$ and $R_3$ represent a substituent, $R_1$ and $R_2$, $R_1$ and $R_3$ or $R_2$ and $R_3$ may be combined together to form a ring, and, in the compound represented by Formula (I), [total molecular weight of primary amine group+total molecular weight of secondary amine group]/[molecular weight of Formula (I)] is 0.3 to 0.84.)

[2] The gas separation membrane as described in (1) above, wherein the cross-linked polymer is a polymer having a repeating unit represented by Formulae (II-1) to (II-3) below:

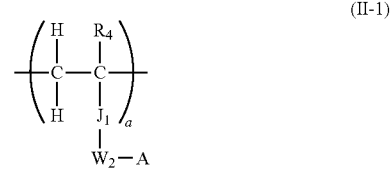

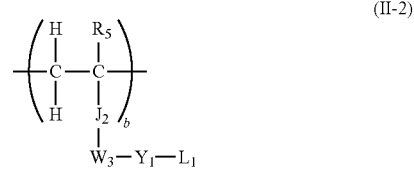

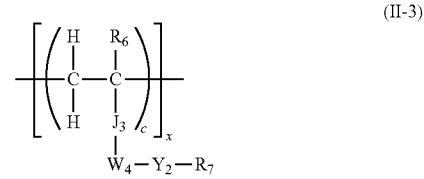

(wherein in Formulae (II-1) to (II-3), each of $R_4$, $R_5$, $R_6$ and $R_7$ independently represents a hydrogen atom or a substituent, $J_1$, $J_2$ and $J_3$ represent —CO—, —COO—, —CONR$_8$—, —OCO—, —O—, a methylene group, a phenylene group, or a —$C_6H_4$CO— group, $R_8$ represents a hydrogen atom or a substituent, $W_2$, $W_3$ and $W_4$ represent a single bond or a bivalent linking group, A represents a dissociable group, $Y_1$ and $Y_2$ represent an alkylene glycol residue structure, each of a, b and c independently represents an integer of 1 or more, x represents an integer of 0 or more, and $L_1$ represents an n-valent linking group.)

[3] The gas separation membrane as described in (2) above, wherein the polymer having the repeating unit represented by Formulae (II-1) to (II-3) is formed by a compound represented by the following Formula (III), the following Formula (IV) and the following Formula (V) or Formula (VI):

Formula (III)

(wherein $R_4$, $J_1$, $W_2$ and A of Formula (III) have the same meaning as $R_4$, $J_1$, $W_2$ and A of Formula (II-1).)

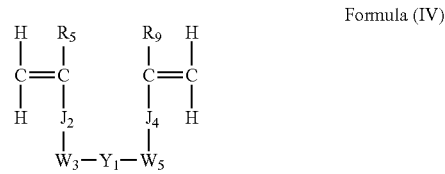

Formula (IV)

(wherein $R_5$, $J_2$, $W_3$ and $Y_1$ of Formula (IV) have the same meaning as $R_5$, $J_2$, $W_3$ and $Y_1$ of Formula (II-2), $R_9$ represents a hydrogen atom or a substituent, $J_4$ represents —CO—, —COO—, —CONR$_{10}$—, —OCO—, —O—, a methylene group, a phenylene group or a —C$_6$H$_4$CO-group, and $R_{10}$ represents a hydrogen atom or a substituent. $W_5$ has the same meaning as $W_3$ of Formula (II-2).)

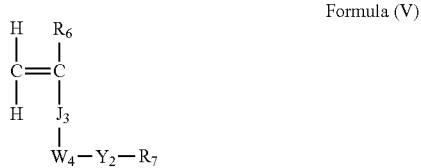

Formula (V)

(wherein $R_6$, $J_3$, $W_4$, $Y_2$ and $R_7$ of Formula (V) have the same meaning as $R_6$, $J_3$, $W_4$, $Y_2$ and $R_7$ of Formula (II-3).)

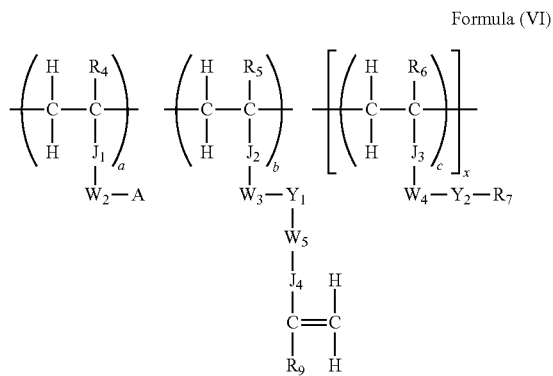

Formula (VI)

(wherein $R_4$, $R_5$, $R_6$, $R_7$, $J_1$, $J_2$, $J_3$, $W_2$, $W_3$, $W_4$, A, a, b, c, x, $Y_1$ and $Y_2$ of Formula (VI) have the same meaning as $R_4$, $R_5$, $R_6$, $R_7$, $J_1$, $J_2$, $J_3$, $W_2$, $W_3$, $W_4$, A, a, b, c, x, $Y_1$ and $Y_2$ of Formulae (II-1) to (II-3), and $R_9$, $W_5$, and $J_4$ of Formula (VI) have the same meaning as $R_9$, $W_5$, and $J_4$ of Formula (IV).)

[4] The gas separation membrane as described in any one of (1) to [3] above, wherein in Formulae (II-1) to (II-3), each of $R_4$, $R_5$, $R_6$ and $R_7$ independently represents a hydrogen atom or an alkyl group, each of $J_1$, $J_2$ and $J_3$ independently represents a —CO— group, a —COO— group, or a —OCO— group, each of $W_2$, $W_3$ and $W_4$ independently represents a single bond, an alkylene group or an alkyleneoxy group, and $L_1$ represents an alkylene group, or an alkyleneoxy group.

[5] The gas separation membrane as described in any one of [2] to [4] above, wherein the dissociable group represented by A is at least one selected from a carboxyl group, a sulfonate group, a phosphate group, a hydroxyl group, —CONHSO$_2$—R$_{11}$, —SO$_2$NHCO—R$_{12}$ or SO$_2$NHSO$_2$—R$_{13}$, provided that R$_{11}$, R$_{12}$ and R$_{13}$ represent a substituent.

[6] The gas separation membrane as described in any one of [1] to [5] above, wherein, in Formula (I), R$_1$, R$_2$ and R$_3$ represent a hydrogen atom or a substituent and W$_1$ represents an alkylene group or an arylene group.

[7] The gas separation membrane as described in any one of [2] to [6] above, wherein the compound represented by Formula (I) and the polymer containing a repeating unit represented by Formulae (II-1) to (II-3) are fixed by covalent bonding.

[8] The gas separation membrane as described in any one of [1] to [7] above, wherein the gas separation membrane further has a porous membrane and the separation-active membrane is disposed at least on the surface of the porous membrane.

[9] The gas separation membrane as described in any one of [1] to [8] above, wherein the gas separation membrane separates at least one acid gas from a mix gas containing the at least one acid gas and at least one non-acid gas.

[10] A method for producing the gas separation membrane as described in any one of [1] to [9] above, wherein the gas separation membrane having the polymer containing at least one repeating unit represented by Formulae (II-1) to (II-3) and at least one compound represented by Formula (I) is formed by heat curing.

[11] A method for producing the gas separation membrane as described in any one of [1] to [9] above, wherein the gas separation membrane having the polymer containing at least one repeating unit represented by Formulae (II-1) to (II-3) and at least one compound represented by Formula (I) is formed by irradiating an active radiation.

[12] A method for separating a gas mixture for separating at least one acid gas from a mixed gas containing the at least one acid gas and at least one non-acid gas using the gas separation membrane as described in any one of [1] to [9] above, wherein the acid gas is at least one selected from carbon dioxide, hydrogen sulfide, carbonyl sulfide, sulfur oxide (SOx), and nitrogen oxide (NOx), and the non-acid gas is at least one selected from hydrogen, methane, nitrogen, and carbon monoxide.

[13] The method as described in [12] above, wherein the acid gas is carbon dioxide or hydrogen sulfide.

[14] A method for separating a gas mixture by using the gas separation membrane as described in any one of [1] to [8] above, wherein main components of the gas mixture are carbon dioxide and methane, or carbon dioxide and hydrogen.

[15] A gas separation membrane module having the gas separation membrane as described in any one of [1] to [9] above.

[16] A gas separation apparatus having at least one of the gas separation membrane module as described in [15] above.

Advantage of the Invention

The gas separation membrane of the present invention provides a gas separation membrane that exhibits superior heat resistance, gas permeability and separation selectivity and plasticity to the extent that it can endure a bending test and has little pinholes and a method for producing the gas separation membrane. According to the gas separation membrane of the present invention, it is possible to provide a superior gas separation method, a gas separation membrane module, and a gas separation apparatus including the gas separation membrane module.

The gas separation membrane of the present invention exhibits superior heat resistance, excellent inhibition of elution of carriers under humidity and excellent stability. In addition, the gas separation membrane has mechanical strength with bending suitability, under high-temperature humidity conditions, inhibits a decrease of separation selectivity and exhibits thermal stability. Furthermore, the gas separation membrane exhibits superior gas separation selectivity, in particular, carbon dioxide permeability, and exerts superior performance as a separation membrane of carbon dioxide/methane, carbon dioxide/hydrogen. According to the gas separation membrane and the composite membrane of the present invention, it is possible to provide a superior gas separation method, a gas separation membrane module, and a gas separation and purification apparatus including the gas separation membrane module.

EMBODIMENTS FOR CARRYING OUT THE INVENTION

Hereinafter, the present invention will be described in detail and should not be construed as limiting the scope of the present invention.

In the present invention, the substituent Z is defined as below.

Substituent Group Z:

an alkyl group (preferably an alkyl group having 1 to 30 carbon atoms, more preferably an alkyl group having 1 to 20 carbon atoms, particularly preferably an alkyl group having 1 to 10 carbon atoms, and examples thereof include methyl, ethyl, iso-propyl, tert-butyl, n-octyl, n-decyl, n-hexadecyl), a cycloalkyl group (preferably a cycloalkyl group having 3 to 30 carbon atoms, more preferably a cycloalkyl group having 1 to 20 carbon atoms, particularly preferably a cycloalkyl group having a cycloalkyl group having 3 to 10 carbon atoms, and examples thereof include cyclopropyl, cyclopentyl, cyclohexyl and the like), an alkenyl group (preferably an alkenyl group having 2 to 30 carbon atoms, more preferably an alkenyl group having 2 to 20 carbon atoms, particularly preferably an alkenyl group having 2 to 10 carbon atoms, and examples thereof include vinyl, allyl, 2-butenyl, 3-pentenyl and the like), an alkynyl group (preferably an alkynyl group having 2 to 30 carbon atoms, more preferably an alkynyl group having 2 to 20 carbon atoms, particularly preferably an alkynyl group having 2 to 10 carbon atoms, and examples thereof include propargyl, 3-pentynyl and the like), an aryl group (preferably an aryl group having 6 to 30 carbon atoms, more preferably an aryl group having 6 to 20 carbon atoms, particularly preferably an aryl group having 6 to 12 carbon atoms, and examples thereof include phenyl, p-methylphenyl, naphthyl, anthranyl and the like), an amino group (preferably an amino group having 0 to 30 carbon atoms, more preferably an amino group having 0 to 20 carbon atoms, particularly preferably an amino group having 0 to 10 carbon atoms and examples thereof include amino, methylamino, dimethylamino, diethylamino, dibenzylamino, diphenylamino, ditolylamino and the like), an alkoxy group (preferably an alkoxy group having 1 to 30 carbon atoms, more preferably an alkoxy group having 1 to 20 carbon atoms, particularly preferably an alkoxy group having 1 to 10 carbon atoms, and examples thereof include methoxy, ethoxy, butoxy, 2-ethylhexyloxy and the like), an aryloxy group (preferably an aryloxy group having 6 to 30 carbon atoms, more preferably an aryloxy group having 6 to 20 carbon atoms, particularly preferably an aryloxy group having 6 to 12 carbon atoms, and examples thereof include phenyloxy, 1-naphthyloxy, 2-naphthyloxy and the like), a heterocyclic oxy group (preferably a heterocyclic oxy group having 1 to 30 carbon atoms, more preferably a heterocyclic oxy group having 1 to 20 carbon atoms, particularly preferably a heterocyclic oxy group having 1 to 12 carbon atoms, and examples thereof include pyridyloxy, pyrazyloxy, pyrimidyloxy, quinolyloxy and the like), an acyl group (preferably an acyl group having 1 to 30 carbon atoms, more preferably an acyl group having 1 to 20 carbon atoms, particularly preferably an acyl group having 1 to 12 carbon atoms, and examples thereof include acetyl, benzoyl, formyl, pivaloyl and the like), an alkoxy carbonyl group (preferably 2 to 30 carbon atoms, more preferably 2 to 20 carbon atoms, particularly preferably 2 to 12 carbon atoms, and examples thereof include methoxy carbonyl, ethoxy carbonyl and the like), an aryloxycarbonyl group (preferably 7 to 30 carbon atoms, more preferably 7 to 20 carbon atoms, particularly preferably 7 to 12 carbon atoms, and examples thereof include phenyloxycarbonyl), an acyloxy group (preferably 2 to 30 carbon atoms, more preferably 2 to 20 carbon atoms, particularly preferably 2 to 10 carbon atoms, and examples thereof include acetoxy, benzoyloxy and the like), an acylamino group (preferably 2 to 30 carbon atoms, more preferably 2 to 20 carbon atoms, particularly preferably 2 to 10 carbon atoms, and examples thereof include acetylamino, benzoylamino and the like), an alkoxycarbonylamine group (preferably an alkoxycarbonylamine group having 2 to 30 carbon atoms, more preferably an alkoxycarbonylamine group having 2 to 20 carbon atoms, particularly preferably an alkoxycarbonylamine group having 2 to 12 carbon atoms, and examples thereof include methoxycarbonylamine and the like), an aryloxycarbonylamine group (preferably an aryloxycarbonylamine group having 7 to 30 carbon atoms, more preferably an aryloxycarbonylamine group having 7 to 20 carbon atoms, particularly preferably an aryloxycarbonylamine group having 7 to 12 carbon atoms and examples thereof include phenyloxycarbonylamine and the like), a sulfonylamine group (preferably a sulfonylamine group having 1 to 30 carbon atoms, more preferably a sulfonylamine group having 1 to 20 carbon atoms, particularly preferably a sulfonylamine group having 1 to 12 carbon atoms, and examples thereof include methanesulfonylamine, benzenesulfonylamine and the like), a sulfamoyl group (preferably a sulfamoyl group having 0 to 30 carbon atoms, more preferably a sulfamoyl group having 0 to 20 carbon atoms, particularly preferably a sulfamoyl group having 0 to 12 carbon atoms, and examples thereof include sulfamoyl, methylsulfamoyl, dimethylsulfamoyl, phenylsulfamoyl and the like), a carbamoyl group (preferably a carbamoyl group having 1 to 30 carbon atoms, more preferably a carbamoyl group having 1 to 20 carbon atoms, particularly preferably a carbamoyl group having 1 to 12 carbon atoms, and examples thereof include carbamoyl, methylcarbamoyl, diethylcarbamoyl, phenylcarbamoyl and the like), an alkylthio group (preferably an alkylthio group having 1 to 30 carbon atoms, more preferably an alkylthio group having 1 to 20 carbon atoms, particularly preferably an alkylthio group having 1 to 12 carbon atoms and examples thereof include methylthio, ethylthio and the like), an arylthio group (preferably an arylthio group having 6 to 30 carbon atoms, more preferably an arylthio group having 6 to 20 carbon atoms, particularly preferably an arylthio group having 6 to 12 carbon atoms, and examples thereof include phenylthio and the like), a heterocyclic thio group (preferably a heterocyclic thio group having 1 to 30 carbon atoms, more preferably a heterocyclic thio group having 1 to 20 carbon atoms, particularly preferably a heterocyclic thio group having 1 to 12 carbon atoms, and examples thereof include pyridylthio, 2-benzimizolylthio, 2-benzoxazolylthio, 2-benzthiazolylthio and the like), a sulfonyl group (preferably a sulfonyl group having 1 to 30 carbon atoms, more preferably a sulfonyl group having 1 to 20 carbon atoms, particularly preferably a sulfonyl group having 1 to 12 carbon atoms, and examples thereof include mesyl, tosyl and the like), a sulfinyl group (preferably a sulfinyl group having 1 to 30 carbon atoms, more preferably a sulfinyl group having 1 to 20 carbon atoms, particularly preferably a sulfinyl group having 1 to 12 carbon atoms, and examples thereof include methanesulfinyl, benzenesulfinyl and the like), a ureido group (preferably a ureido group having 1 to 30 carbon atoms, more preferably a ureido group having 1 to 20 carbon atoms, particularly preferably a ureido group having 1 to 12 carbon atoms, and examples thereof include ureido, methylureido, phenylureido and the like), a phosphoric acid amide group (preferably a phosphoric acid amide group having 1 to 30 carbon atoms, more preferably a phosphoric acid amide group having 1 to 20 carbon atoms, particularly preferably a phosphoric acid amide group having 1 to 12 carbon atoms and examples thereof include diethylphosphoric acid amide, phenylphosphoric acid amide and the like), a hydroxyl group, a mercapto group, a halogen atom (for example, a fluorine atom, a chlorine atom, a bromine atom and an iodine atom, more preferably a fluorine atom), a cyano group, a sulfo group, a carboxyl group, an oxo group, a nitro group, a hydroxamic acid group, a sulfino group, a hydrazine group, an imino group, a heterocyclic group (preferably a heterocyclic group having 1 to 30 carbon atoms, more preferably a heterocyclic group having 1 to 12 carbon atoms, and examples of a hetero atom include a nitrogen atom, an oxygen atom and a sulfur atom, specifically examples of the heterocyclic group include imidazolyl, pyridyl, quinolyl, furyl, thienyl, piperidyl, morpholino, benzoxazolyl, benzimidazolyl, benzthiazolyl, carbazolyl, azepinyl groups and the like), a silyl group (preferably a silyl group having 3 to 40 carbon atoms, more preferably a silyl group having 3 to 30 carbon atoms, particularly preferably a silyl group having 3 to 24 carbon atoms and examples thereof include trimethylsilyl, triphenylsilyl and the like), a silyloxy group (preferably a silyloxy group having 3 to 40 carbon atoms, more preferably a silyloxy group having 3 to 30 carbon atoms, particularly preferably a silyloxy group having 3 to 24 carbon atoms and examples thereof include trimethylsilyloxy, triphenylsilyloxy and the like) and the like. These substituents may be further substituted by one or more substituent selected from the substituent group Z.

The gas separation membrane of the present invention is a gas separation membrane to separate at least one acid gas from a mix gas containing at least one acid gas and at least one non-acid gas, wherein the gas separation membrane includes a separation-active membrane containing a compound represented by the following Formula (I) having a boiling point or a decomposition temperature of 200° C. or higher and a cross-linked polymer having a dissociable group and repeating unit derived from alkylene glycol.

Preferably, the gas separation membrane of the present invention further has a porous membrane and has the separation-active membrane at least on the surface of the porous membrane.

The separation-active membrane preferably has heat resistance of 100° C. or higher, more preferably heat resistance of 150° C. or higher, from a viewpoint in which a separation membrane can be used at a high temperature as possible and cost of separation energy is thus reduced.

[Separation-Active Membrane]

The separation-active membrane according to the present invention contains a compound represented by Formula (I) having a boiling point or a decomposition temperature of 200° C. or higher and a cross-linked polymer having a dissociable group and a repeating unit derived from alkylene glycol. Generally, hydrogen is prepared by modification of natural gas with water vapor and water gas shift. Specifically, methane as a main component of natural gas is converted into a mixed gas of carbon monoxide and hydrogen in the presence of a catalyst by modification with water vapor and is subsequently converted into a mixed gas of carbon dioxide and hydrogen by water gas shift. The water vapor modification process is generally carried out at 800° C. or higher, and the water gas shift is carried out at about 200 to about 250° C. When taking into consideration of the separation of hydrogen and carbon dioxide in the downstream of the water gas shift process, gas separation is preferably accomplished at a temperature as high as possible in terms of energy efficiency. Accordingly, carriers contained the separation-active membrane require stability at high temperatures and preferably have a boiling point or a decomposition temperature of 200° C. to 700° C., more preferably 200° C. to 400° C. The boiling point or decomposition temperature of the compound represented by Formula (I) is 200° C. or higher, thereby obtaining superior gas separation selectivity even at high temperature conditions.

The formation of separation-active membrane will be described in detail below.

The separation-active membrane can be formed using a composition containing the compound represented by the following Formula (I) having a boiling point or a decomposition temperature of 200° C. or higher, and a cross-linked polymer having a dissociable group and repeat units derived from alkylene glycol.

In addition, the separation-active membrane is preferably a gel membrane. When the separation-active membrane is a gel membrane, the capability of storing solvent, in particular, water, in the membrane is expected to be high due to a three-dimensional network and more stable facilitated transport membrane can be thus formed.

The gel membrane preferably has a cross-linkage structure from a viewpoint of imparting plasticity resistance, heat resistance, pressure resistance and mechanical strength when being absorbed an acid gas and preferably contains a polymer having a cross-linkage structure derived from an aldehyde group, an epoxide group, an isocyanate group, a carbodiimide group or oxazoline group.

(Compound Represented by Formula (I))

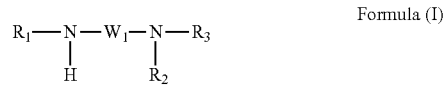

Formula (I)

(In Formula (I), $R_1$, $R_2$ and $R_3$ represent a hydrogen atom or a substituent and $W_1$ represents a bivalent linking group. When $R_1$, $R_2$ and $R_3$ represent a substituent, $R_1$ and $R_2$, $R_1$ and $R_3$ or $R_2$ and $R_3$ may be combined together to form a ring. In the compound represented by Formula (I), [total molecular weight of primary amine group+total molecular weight of secondary amine group]/[molecular weight of Formula (I)] is 0.3 or more.)

Each of the substituent represented by $R_1$, $R_2$ and $R_3$ may be independently selected from the substituent group Z. Preferably, each of the substituents is independently a hydrogen atom, an alkyl group and an aryl group, more preferably a hydrogen atom or an alkyl group.

The bivalent linking group represented by $W_1$ is a linking group including a repeating unit represented by (L-1) to (L-35) described below or a combination thereof and is preferably an alkylene group or an arylene group, more preferably an alkylene group.

In Formula (I), it is preferred that $R_1$, $R_2$ and $R_3$ represent a hydrogen atom, or an alkyl group and $W_1$ represents an alkylene group or an arylene group.

In the compound represented by Formula (I), [total molecular weight of primary amine group+total molecular weight of secondary amine group]/[molecular weight of Formula (I)] is 0.3 or more, preferably 0.3 to 0.84, more preferably 0.3 to 0.7. When [total molecular weight of primary amine group+total molecular weight of secondary amine group]/[molecular weight of Formula (I)] is 0.3 or more, effects can be exerted at a smaller addition amount and superior effects can also be exerted even at a high concentration of acid gas, since a carrier has a high reaction site density per unit addition amount. When [total molecular weight of primary amine group+total molecular weight of secondary amine group]/[molecular weight of Formula (I)] is calculated, the calculation may be carried out by setting the molecular weight of primary amine group at 16 and the molecular weight of secondary amine group at 15, respectively, and dividing the sum of the groups thereof by the molecular weight of Formula (I). With respect to the polymer, it can be calculated based on calculation of unit components.

Specific examples of the compound represented by Formula (I) include the following compounds and the present invention is not limited thereto. In addition, p, q and r represent numbers of repeating units.

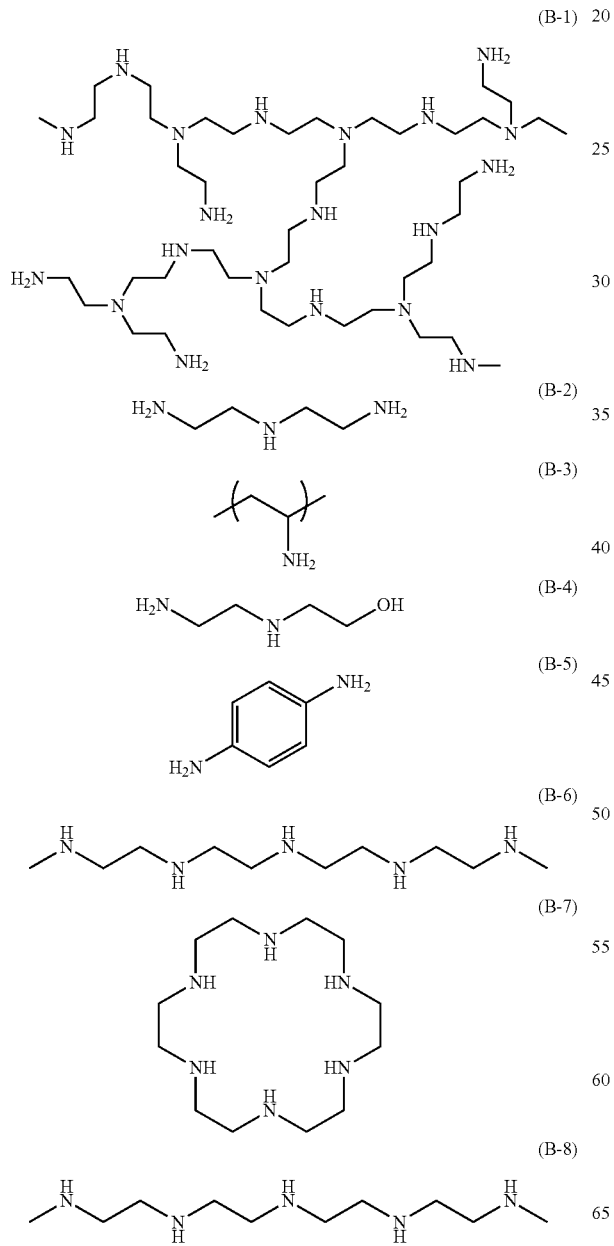
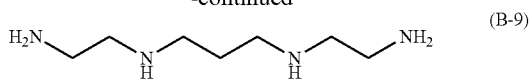
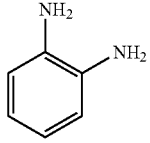
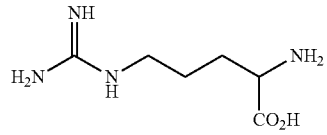
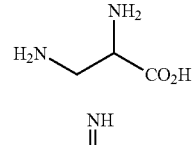

The compound represented by Formula (I) is commercially available or obtained by a general synthetic method, for example, with reference to "organic synthetic II (alcohol and amine)" edited by the Japanese Chemical Society (issued by Maruzen Co. Ltd.).

The compound represented by Formula (I) is a compound that could interact with an acid gas and may be used as an acid gas carrier. The membrane having this carrier is generally referred to as a facilitated transport membrane, which is described in "Material Science of Membranes for Gas and Vapor Separation" Chapter 17 (pp 411-435) (edited by Yu. Yampolskii, I. Pineau, B. D. Freeman) in detail.

Examples of the acid gas include carbon dioxide, hydrogen sulfide, carbonyl sulfide, sulfur oxide (SOx), nitrogen oxide (NOx) and the like and is preferably at least one selected from carbon dioxide, hydrogen sulfide, carbonyl sulfide, sulfur oxide (SOx), and nitrogen oxide (NOx), more preferably carbon dioxide, hydrogen sulfide or sulfur oxide (SOx), more preferably carbon dioxide or hydrogen sulfide, more preferably carbon dioxide.

The term "interaction" means an action or response attributed to properties of a target acid gas and examples thereof include dipole interaction, acid-base interaction, coulomb interaction, size interaction and the like. This interaction can improve adsorbability, compatibility or reactivity with the target acid gas, further facilitate absorption, permeation and diffusion of acid gas into the membrane, and achieve enhancement of the difference in permeability between an acid gas and a non-acid gas.

The compound represented by Formula (I) is preferably a compound having a molecular weight of 150,000 or less.

A polymer containing the compound represented by Formula (I) and a repeating unit represented by Formulae (II-1) to (II-3) is preferably fixed (supported in a membrane) and is preferably fixed through covalent bonding. Accordingly, a gas separation membrane that has excellent heat resistance, inhibition of elution of carriers under humid conditions, and stability can be obtained.

In the gas separation membrane of the present invention, an acid gas carrier other than the compound represented by Formula (I) may be used. The acid gas carrier other than the compound represented by Formula (I) is not particularly limited, is preferably a compound having an affinity to an acid gas and examples thereof include hydroxide of alkali metal (for example, sodium hydroxide, potassium hydroxide, rubidium hydroxide and cesium hydroxide), alkoxide of alkali metal (for example, sodium methoxide, sodium ethoxide, tert-butoxy sodium and tert-butoxy potassium), alkali metal carbonate (for example, sodium carbonate, potassium carbonate, rubidium carbonate and cesium carbonate), alkali metal bicarbonate (for example, sodium hydrogen carbonate and potassium hydrogen carbonate), alkali metal phosphate (sodium phosphate and potassium phosphate), hydroxide of alkaline earth metal, alkoxide of alkaline earth metal, alkaline earth metal carbonate, alkaline earth metal bicarbonate, alkali metal phosphate, tetraammonium hydroxide (for example, tetramethylammonium hydroxide, benzyltrimethylammonium hydroxide, choline hydroxide and tetrabutylammonium hydroxide), guanidines (for example, guanidine and tetramethylguanidine), heterocyclic bases (for example, 1,8-diazabicyclo[5.4.0]-7-undecene and 1,8-diazabicyclo[4,3,0]-7-nonene), amino acids (for example, glycine, dimethylamine glycine, and 2,3-diaminopropionic acid), complexes (for example, rhodium metal complexes described in JP-A-6-142466 or molybdenum complexes described in JP-A-6-142467), ion liquids (for example, chemical substances selected from compounds formed by a combination of the following cations and anions:

(i) cations: imidazolium having the following substituent at a 1,3 position in which the substituent is an alkyl group, a hydroxyalkyl group, an ether group, an allyl group, an amine alkyl group or an aryl group; pyrrolidinium cations having an alkyl group, a hydroxyalkyl group, an ether group, an allyl group, an amine alkyl group or an aryl group as a substituent; pyridinium cations having an alkyl group or an aryl group as a substituent; phosphonium cations having an alkyl group, a hydroxyalkyl group, an ether group, an allyl group, an amine alkyl group or an aryl group as a substituent; or tetraammonium cations having an alkyl group, a hydroxyalkyl group, an ether group, an allyl group, an amine alkyl group or an aryl group as a substituent.

(ii) anions: chloride ions, bromide ions, boron tetrafluoride ions, nitrate ions, bis(trifluoromethanesulfonyl)imide ions, bis(perfluorobutylmethanesulfonyl)imide ions, hexafluorophosphate ions, trifluoromethanesulfonate ions or the like. In addition, specific examples of useful ion liquids include 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl)ammonium tetrafluoroborate, ethylmethylimidazolium bis(trifluoromethanesulfonyl) imide, ethylmethylimidazolium bistrifluoromethane sulfonate, ethylmethylimidazolium dicyanamide, and trihexyltetradecylphosphonium chloride and the like, and ion liquids are preferably imidazolium salts, tetraammonium salts, pyridinium salts and phosphonium salts, more preferably imidazolium salts, pyridinium salts and phosphonium salts, more preferably pyridinium salts or phosphonium salts.

In addition, examples of the additive, other than ion liquids, include additives well-known in the art, such as chemical substances selected from glycerin, polyglycerin, polyethylene glycol, polypropylene glycol, polyethylene oxide, polyethylene imine, polyallylamine and polyacrylic acid). In addition, the carbonate or bicarbonate of alkali metal may be used in together with a multidentate ligand that forms a complex with an alkali metal ion, or sodium arsenite, carbonic anhydrase, boric acid as an auxiliary additive ingredient.

Examples of useful multidentate ligands that form a complex with an alkali metal ion include multidentate ligands conventionally well-known in the art, for example: cyclic polyethers such as 12-crown-4, 15-crown-5, 18-crown-6, benzo-12-crown-4, benzo-15-crown-5, benzo-18-crown-6, dibenzo-12-crown-4, dibenzo-15-crown-5, dibenzo-18-crown-6, dicyclohexyl-12-crown-4, dicyclohexyl-15-crown-5, dicyclohexyl-18-crown-6, n-octyl-12-crown-4, n-octyl-15-crown-5, n-octyl-18-crown-6; cyclic polyetheramine such as cryptand [2.1] and cryptand [2.2]; bicyclic polyetheramine such as cryptand [2.1.1] and cryptand [2.2.2], as well as porphyrin, phthalocyanine, polyethylene glycol, ethylenediaminetetraacetic acid and the like.

The acid gas carrier is not limited to those described above, any substance may be used as the acid gas carrier so long as it has an affinity to an acid gas and is water-soluble and may be selected from a variety of compounds such as alkali metal salts of organic acids. In terms of low chemical stability and low risk of losing from membranes due to low vapor pressure of carriers, hydroxide of alkali metal, alkoxide of alkali metal, alkali metal carbonate, alkali metal bicarbonate, alkali metal phosphate, hydroxide of alkaline earth metal, alkoxide of alkaline earth metal, alkaline earth metal carbonate, alkaline earth metal bicarbonate, alkali metal phosphate, organic amines, ion liquids, or metal complexes that can exhibit long-term durability of separation performance are preferred. Organic amine, alkali metal carbonate, alkali metal bicarbonate and alkali metal phosphate are more preferred and organic amine, alkali metal carbonate and alkali metal phosphate are even more preferred.

In addition, examples of acid gas carriers include water-soluble sulfite such as sodium sulfite or potassium sulfite known as a sulfur dioxide carrier, hemoglobin known as an oxygen or carbon monoxide carrier, a water-soluble copper compound that form copper complex ions, such as $Cu(NH_4)_2^+$ and $Cu(Cl_2)_2^-$, known as a carbon monoxide carrier, and the like. In addition, a mixture of these carriers may be also used. The molecular weight of the carrier is 150,000 or less, preferably is 100 to 100,000, more preferably is 100 to 5,000, even more preferably 100 to 3,000.

The content of the compound represented by Formula (I) is 5 to 90% by mass, more preferably is 10 to 80% by mass, even more preferably 30 to 70% by mass, based on the total solid of the composition constituting the separation-active membrane.

Examples of the compound represented by Formula (I) include alkanolamine, specifically, monoethanolamine, diethanolamine, triethanolamine, ethylmonoethanolamine, n-butylmonoethanolamine, dimethylethanolamine, ethyldiethanolamine, n-butylethanolamine, di-n-butylethanolamine, triisopropanolamine, PAMAM dendrimers, dendrimers modified with a hydroxyl group described in JP-A-2007-54710, polyallylamine or polyethyleneimine and the like (Cross-Linked Polymer)

The cross-linked polymer used in the present invention is a cross-linked polymer having a dissociable group and a repeating unit derived from alkylene glycol.

The cross-linked polymer having a repeating unit derived from alkylene glycol is not particularly limited and preferably has at least one repeating unit selected from at least one of polyethylene glycol and polypropylene glycol. For this reason, plasticity can be imparted to membranes. In addition, the difference in diffusion property between carbon dioxide and hydrogen in membranes can be reduced, reverse separation selectivity of carbon dioxide and hydrogen can be more effectively exhibited and high gas permeability can be exhibited. In addition, a repeating unit hays a polarized structure, thus exerting superior affinity by exhibiting interaction with polarity of an acid gas and thereby improving solubility in membranes.

The cross-linked polymer more preferably contains a polymer having a repeating unit represented by Formulae (II-1) to (II-3) below (hereinafter, referred to as cross-linked polymer (A1) in some cases).

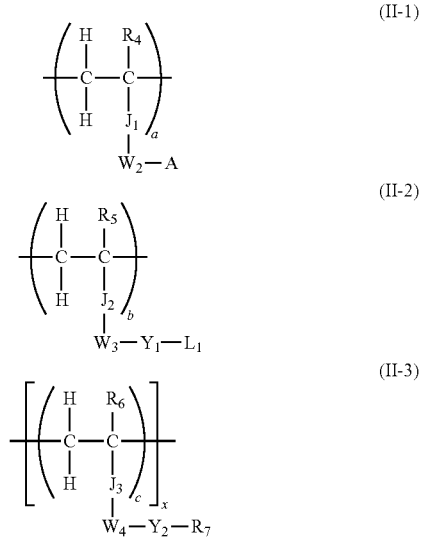

(In Formulae (II-1) to (II-3), each of $R_4$, $R_5$, $R_6$ and $R_7$ independently represents a hydrogen atom or a substituent. $J_1$, $J_2$ and $J_3$ represent —CO—, —COO—, —CONR$_8$—, —OCO—, —O—, a methylene group, a phenylene group, or a —C$_6$H$_4$CO— group, $R_8$ represents a hydrogen atom or a substituent. $W_2$, $W_3$ and $W_4$ represent a single bond or a bivalent linking group. A represents a dissociable group. $Y_1$ and $Y_2$ represent an alkylene glycol residue structure. Each of a, b and c independently represents an integer of 1 or more, x represents an integer of 0 or more. $L_1$ represents an n-valent linking group.)

In Formulae (II-1) to (II-3), each of $R_4$, $R_5$, $R_6$ and $R_7$ independently represents a hydrogen atom or a substituent. The substituent may be any one selected from the substituent group Z described above.

$R_4$, $R_5$, $R_6$ and $R_7$ are preferably a hydrogen atom or an alkyl group, more preferably a hydrogen atom, a methyl group or an ethyl group, even more preferably a hydrogen atom.

Each of $J_1$, $J_2$ and $J_3$ independently represents —CO—, —COO—, —CONR$_2$—, —OCO—, a methylene group, a phenylene group or a —C$_6$H$_4$CO— group. $R_2$ represents a hydrogen atom, an alkyl group, an aryl group or an aralkyl group, preferably a hydrogen atom, an alkyl group or an aryl group, and a preferred range thereof is the same as that of an alkyl group or an aryl group described in the substituent Z. Among these, $J_1$, $J_2$ and $J_3$ are preferably —CO—, —COO— or —OCO—, particularly preferably —COO—.

Each of $W_2$, $W_3$ and $W_4$ independently represents a bivalent linking group. Examples of the bivalent linking group include linear, branched or cyclic alkylene groups (preferably alkylene groups having 1 to 30 carbon atoms, more preferably alkylene groups having 1 to 12 carbon atoms, more preferably alkylene groups having 1 to 4 carbon atoms, examples thereof include methylene, ethylene, propylene, butylene, pentylene, hexylene, octylene, decylene and the like), alkyleneoxy groups (preferably alkyleneoxy groups having 1 to 30 carbon atoms, more preferably alkyleneoxy groups having 1 to 12 carbon atoms, more preferably alkyleneoxy groups having 1 to 4 carbon atoms, and examples thereof include methyleneoxy, ethyleneoxy, propyleneoxy, butyleneoxy, pentyleneoxy, hexyleneoxy, octyleneoxy, decyleneoxy and the like), aralkylene groups (preferably aralkylene groups having 7 to 30 carbon atoms, more preferably aralkylene groups having 7 to 13 carbon atoms, and examples thereof include benzylidene, cinnamylidene and the like), arylene groups (preferably arylene groups having 6 to 30 carbon atoms, more preferably arylene groups having 6 to 15 carbon atoms, and examples thereof include phenylene, cumenylene, mesitylene, tolylene, xylene and the like) and the like, and alkyleneoxy groups are more preferred. These compounds may further have a substituent. Examples of the further substituent include an alkyl group, an alkylene group, an alkoxy group, a silyl group and a silyloxy group, and an alkyl group or silyloxy group is preferred. In addition, a compound having an ether bond in the molecule is also preferred.

Specific examples of linking group represented by $W_2$, $W_3$ and $W_4$ include linking groups having structural units represented by (L-1) to (L-35) below or a combination thereof.

$L_1$ represents an n-valent linking group, specific examples thereof include linking groups having structural units represented by (L-1) to (L-35) below or a combination thereof. The polymer having a repeating unit represented by Formula (I) has a cross-linkage structure in which a repeating unit of Formula (I) is bonded to one another through $L_1$.

n represents a positive integer of 2 or more, and is preferably 2 to 6, more preferably 2 to 4.

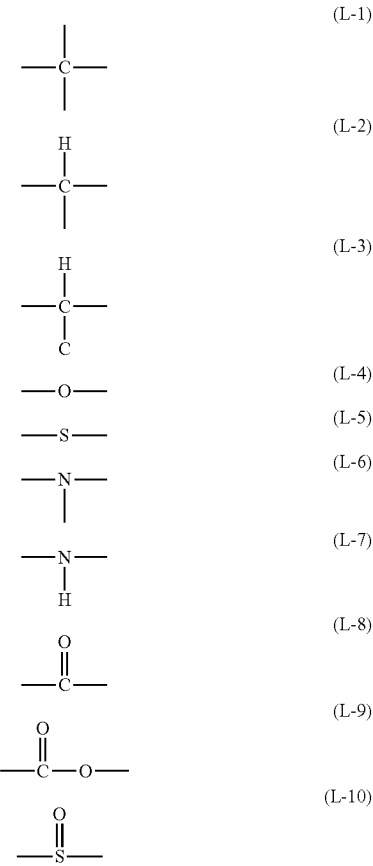

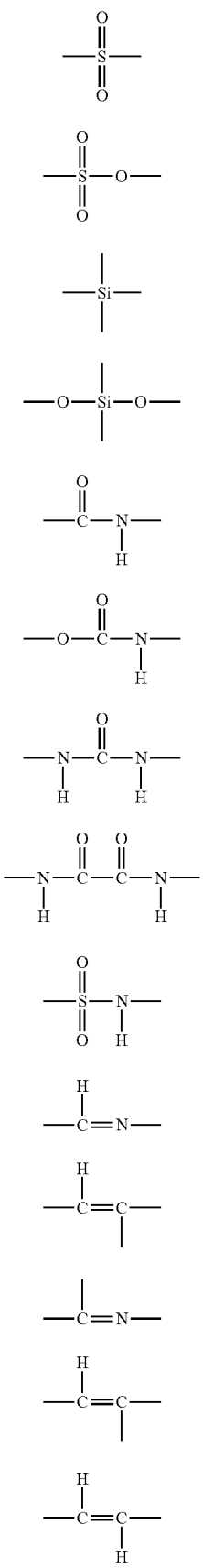

(L-11) 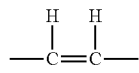

(L-12) 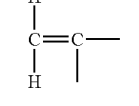

(L-13) 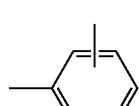

(L-14) 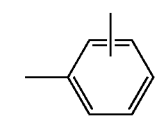

(L-15) 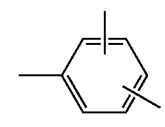

(L-16) 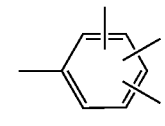

(L-17) 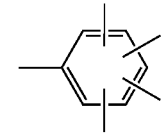

(L-18) 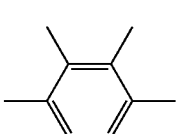

(L-19) 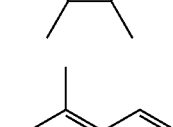

(L-20) 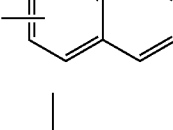

(L-21) 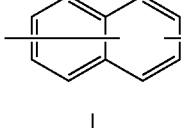

(L-22) 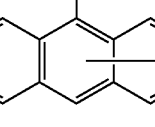

(L-23) 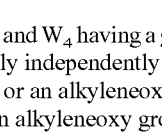

(L-24)

Each of $W_2$, $W_3$ and $W_4$ having a group selected from (L-1) to (L-35) preferably independently represents a single bond, an alkylene group or an alkyleneoxy group, more preferably a single bond or an alkyleneoxy group.

$L_1$ having a group selected from (L-1) to (L-35) preferably represents a single bond or an alkylene group or an alkyleneoxy group, more preferably a single bond or an alkyleneoxy group.

A represents a dissociable group, is preferably a dissociable group having pKa of 5 or less in water and is preferably at least one selected from a carboxyl group, a sulfonate group, a phosphate group, a hydroxyl group, —CONHSO$_2$—R$_{11}$, —SO$_2$NHCO—R$_{12}$ and —SO$_2$NHSO$_2$—R$_{13}$ (in which R$_{11}$, R$_{12}$ and R$_{13}$ preferably represent a substituent Z). A more preferably represents a carboxyl group, a sulfonate group or a phosphate group, more preferably a carboxyl group or a sulfonate group.

Each of Y$_1$ and Y$_2$ independently represents an alkylene glycol residue structure. The molecular weight of alkylene glycol residue structure is preferably 500 to 1,000,000, more preferably 500 to 500,000, more preferably 1,000 to 300,000.

In Formulae (II-1) to (II-3), each of R$_4$, R$_5$, R$_6$ and R$_7$ independently represents a hydrogen atom or an alkyl group, each of J$_1$, J$_2$ and J$_3$ independently represents a —CO— group, a —COO— group or a —OCO— group, each of W$_2$, W$_3$ and W$_4$ independently represents a single bond, an alkylene group or an alkyleneoxy group, L$_1$ particularly preferably represents an alkylene group or an alkyleneoxy group.

The polymer containing a repeating unit represented by Formulae (II-1) to (II-3) is preferably formed by using a compound represented by the following Formula (III), the following Formula (IV) and the following Formula (V) or Formula (VI).

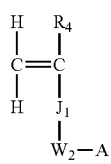

Formula (III)

(In Formula (III), R$_4$, J$_1$, W$_2$ and A have the same meaning as R$_4$, J$_1$, W$_2$ and A in Formula (II-1).)

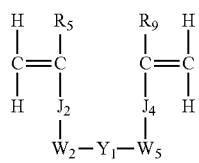

Formula (IV)

(In Formula (IV), R$_5$, J$_2$, W$_3$ and Y$_1$ have the same meaning as R$_5$, J$_2$, W$_3$ and Y$_1$ in Formula (II-2), R$_9$ represents a hydrogen atom or a substituent, J$_4$ represents —CO—, —COO—, —CONR$_{10}$—, —OCO—, —O—, a methylene group, a phenylene group or a —C$_6$H$_{14}$CO-group, and R$_{10}$ represents a hydrogen atom or a substituent. W$_5$ has the same meaning as W$_3$ in Formula (II-2).)

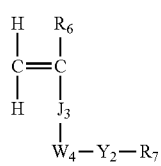

Formula (V)

(In Formula (V), R$_6$, J$_3$, W$_4$, Y$_2$ and R$_7$ of Formula (V) have the same meaning as R$_6$, J$_3$, W$_4$, Y$_2$ and R$_7$ of Formula (II-3).)

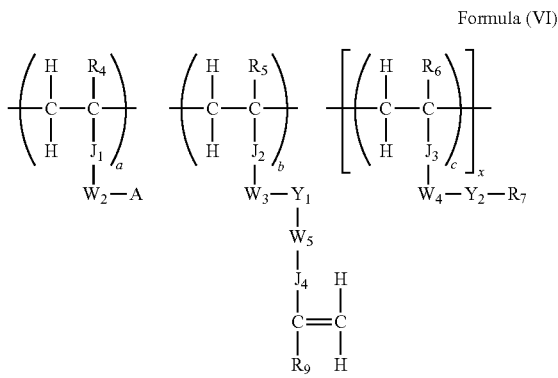

Formula (VI)

(In formula (VI), R$_4$, R$_5$, R$_6$, R$_7$, J$_1$, J$_2$, J$_3$, W$_2$, W$_3$, W$_4$, A, a, b, c, x, Y$_1$ and Y$_2$ of Formula (VI) have the same meaning as R$_4$, R$_5$, R$_6$, R$_7$, J$_1$, J$_2$, J$_3$, W$_2$, W$_3$, W$_4$, A, a, b, c, x, Y$_1$ and Y$_2$ of Formulae (II-1) to (II-3), and R$_9$, W$_5$, and J$_4$ of Formula (VI) have the same meaning as R$_9$, W$_5$, and J$_4$ of Formula (IV).)

The polymer having a repeating unit represented by Formulae (II-1) to (II-3) may have a repeating unit other than Formulae (II-1) to (II-3) and examples of the repeating unit include polyallylamine, polyethylene glycol, polypropylene glycol and the like.

The content of repeating units represented by Formulae (II-1) to (II-3) in the cross-linked polymer (A1) is preferably 10 to 90 mol %, more preferably 20 to 80 mol %, particularly preferably 25 to 70 mol %, with respect to the total repeating units constituting the cross-linked polymer (A1). Within this range, hydrophilicity and membrane-forming property are excellent.

The repeating unit represented by Formula (II-2) is preferably 10 to 90 mol %, more preferably 20 to 80 mol %, and particularly preferably 25 to 70 mol %, with respect to a repeating unit represented by Formula (II-1).

The repeating unit represented by Formula (II-3) is preferably 10 to 90 mol %, more preferably 20 to 80 mol %, and particularly preferably 25 to 70 mol %, with respect to a repeating unit represented by Formula (II-1).

The repeating unit represented by Formulae (II-1) to (II-3) can be obtained by copolymerizing monomers corresponding to respective repeating units.

The polymer having a repeating unit represented by Formulae (II-1) to (II-3) can be obtained by copolymerizing the following monomers as raw materials and the present invention is not limited thereto. In the following monomers, p, q and r represent numbers of a repeating unit.

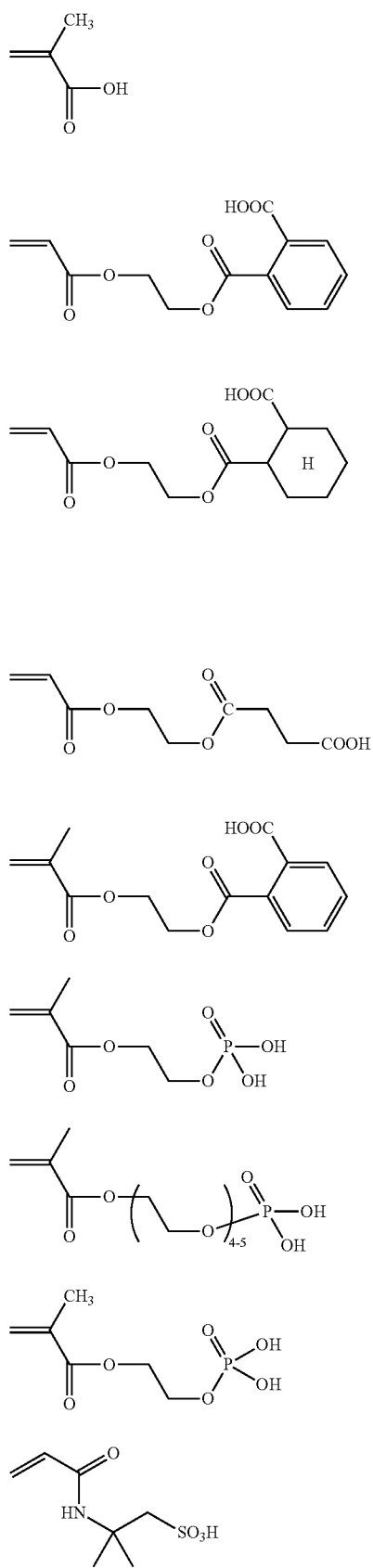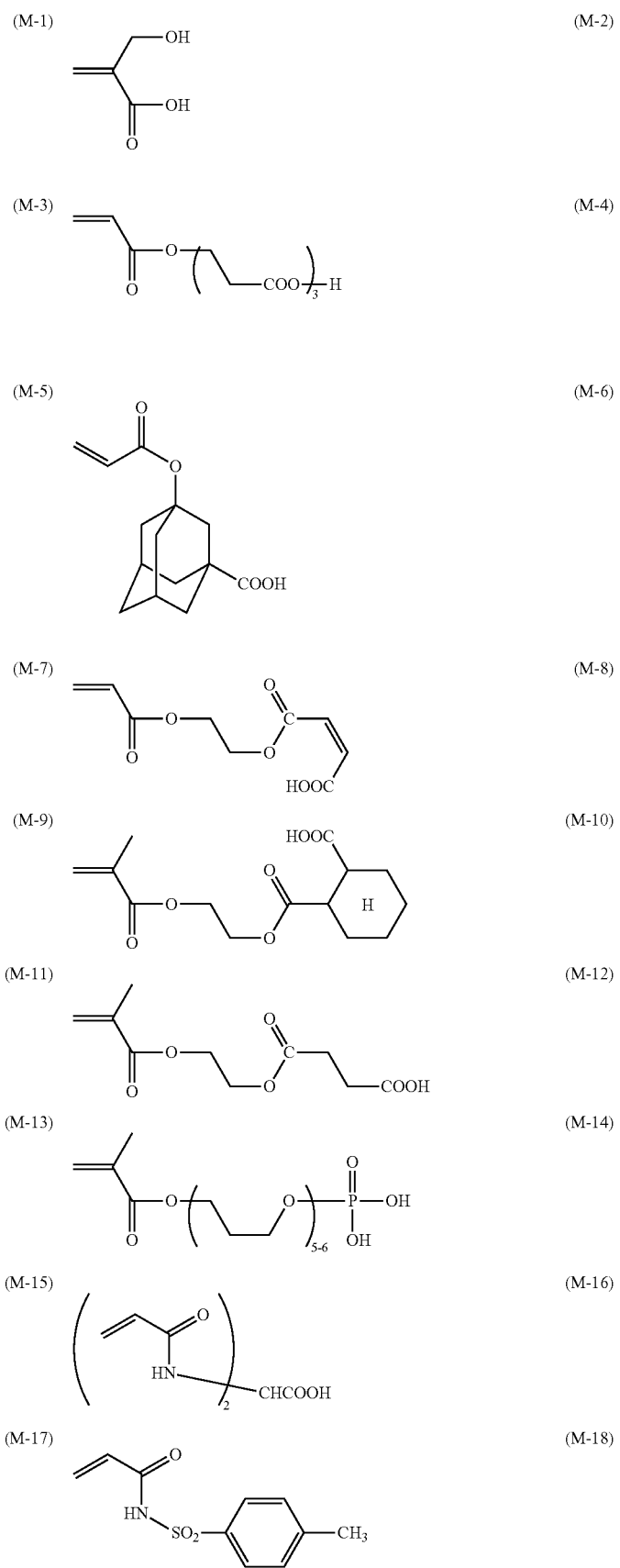

(M-19)
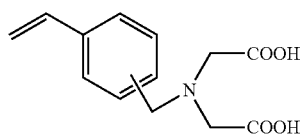
(M-20)
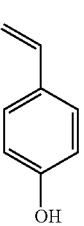
(M-21)
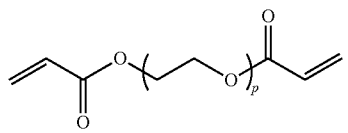
(M-22)
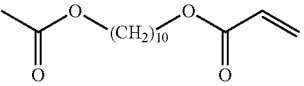
(M-23)
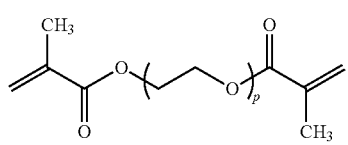
(M-24)
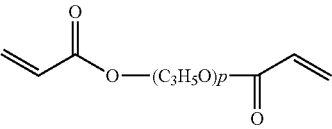
(M-25)
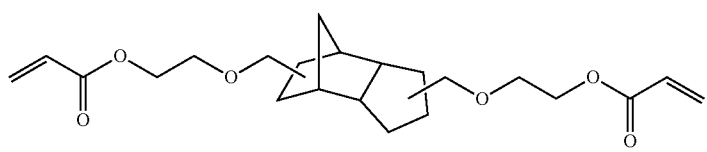
(M-26)
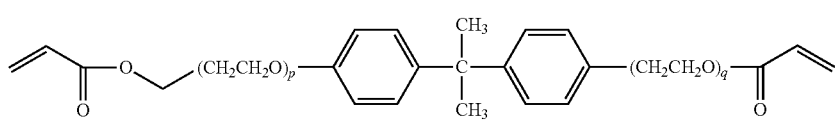
(M-27)
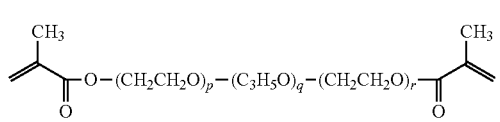
(M-28)
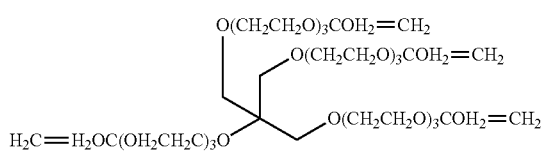
(M-29)
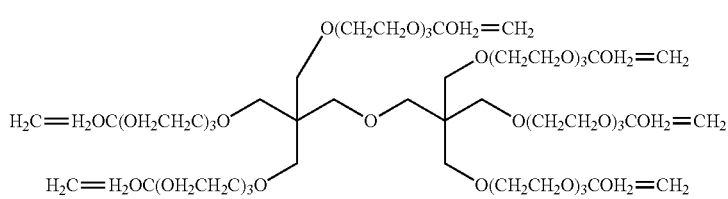
(M-30)
(M-31)
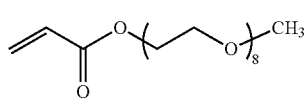
(M-32)
(M-33)
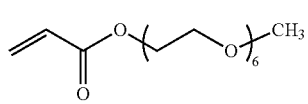
(M-34)

(M-35)
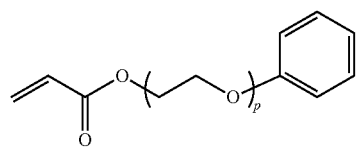
(M-36)
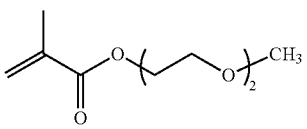
(M-37)
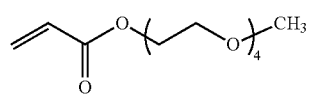
(M-38)
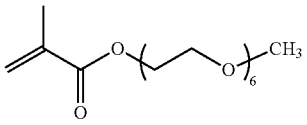
(M-39)
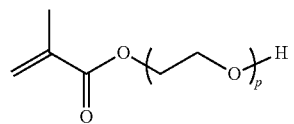
(M-40)
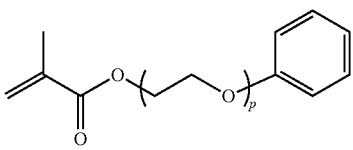
(M-41)
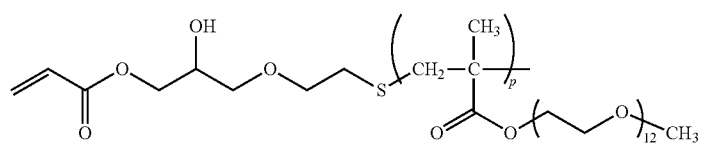
(M-42)
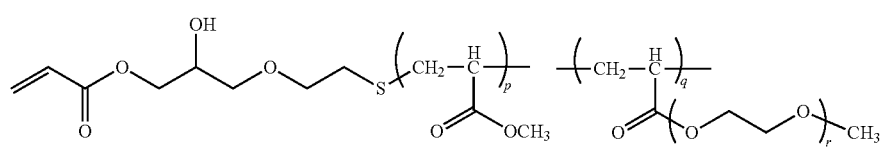
(M-43)
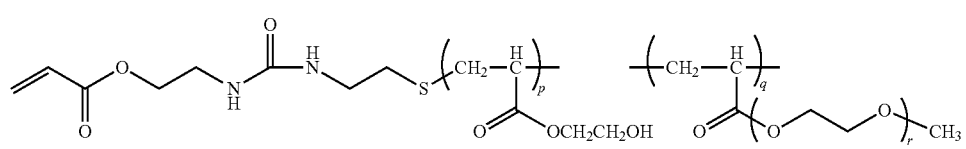
(M-44)
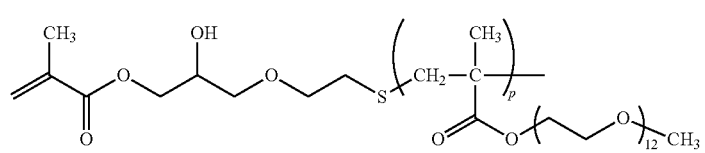
(M-45)
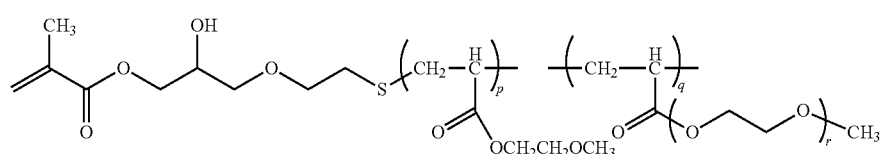
(M-46)
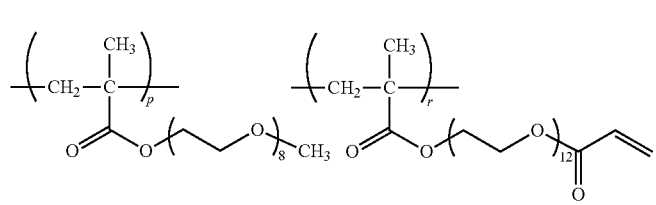
(M-47)
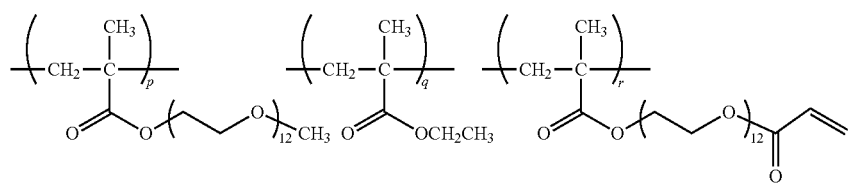

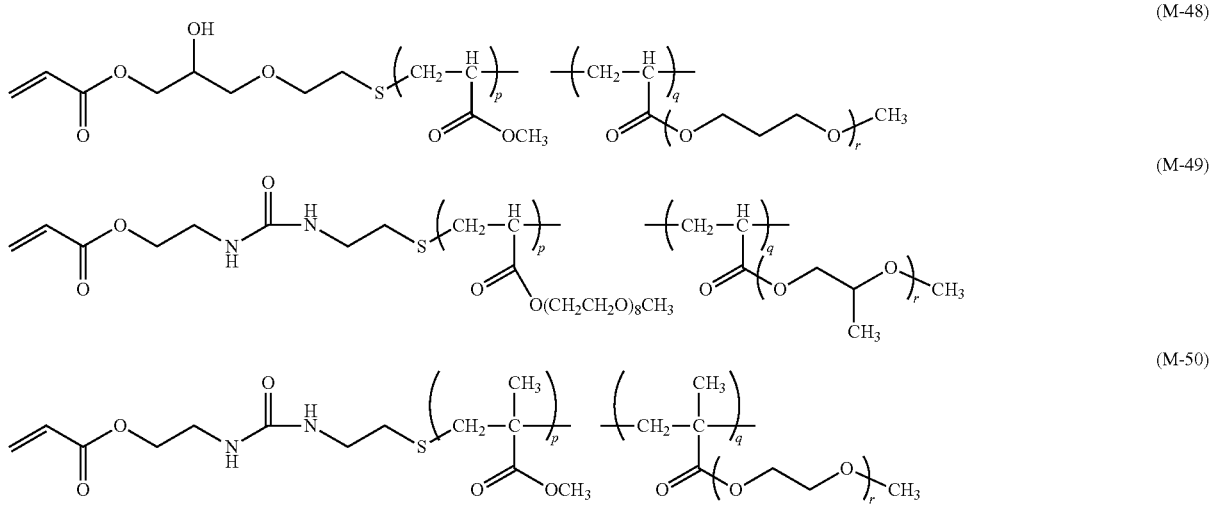

The content of a repeating unit represented by Formula (II-1) in the cross-linked polymer is preferably 10 to 90 mol %, more preferably 20 to 80 mol %, and particularly preferably 25 to 70 mol %, with respect to the total repeating units constituting the cross-linked polymer.

The content of a repeating unit represented by Formula (II-2) in the cross-linked polymer is preferably 10 to 90 mol %, more preferably 20 to 80 mol %, and particularly preferably 25 to 70 mol %, with respect to the total repeating units constituting the cross-linked polymer.

The content of a repeating unit represented by Formula (II-3) in the cross-linked polymer is preferably 10 to 90 mol %, more preferably 20 to 80 mol %, and particularly preferably 25 to 70 mol %, with respect to the total repeating units constituting the cross-linked polymer.

Since the cross-linked polymer constituting the gas separation membrane of the present invention has a three-dimensional cross-linkage structure, molecular weight thereof is not particularly limited. The weight average molecular weight of cross-linked polymer as a main chain or a side chain except the cross-linkage structure part is preferably 1,000 to 100,000, more preferably 1,000 to 50,000, more preferably 2,000 to 15,000, in terms of polystyrene based on a GPC method.

In the same manner as above, the dispersibility of the cross-linked polymer is not particularly limited, the main chain or side chain is preferably 1 to 5, more preferably 1 to 3, even more preferably 1 to 2. Within this range, superior membrane-forming property and mechanical strength can be achieved.

The cross-linked polymer may be used alone or in combination of two or more types.

The content of the cross-linked polymer is preferably 0.1 to 90% by mass, more preferably 1 to 70% by mass, even more preferably 5 to 50% by mass, based on the total solid of the composition constituting the separation-active membrane.

Respective compounds to synthesize the polymers having a repeating unit of Formulae (II-1) to (II-3) may be commercially available or easily synthesized.

The polymer according to the present invention may be a copolymer with other monomers. Examples of useful other monomers include well-known monomers such as acrylic acid esters, methacrylic acid esters, acrylamides, methacrylamides, vinyl esters, styrenes, acrylic acid, methacrylic acid, acrylonitrile, maleic anhydride and maleic imide. By copolymerizing these monomers, various physical properties such as membrane-forming property, membrane strength, hydrophilicity, hydrophobicity, solubility, reactivity and stability can be improved.

The synthesis of monomers is for example carried out with reference to ester synthesis of "$5^{th}$ experiment science lecture 16, organic synthesis (IV)" or handling or purification items of monomers of "$5^{th}$ experiment science lecture 26, polymer chemistry" edited by the Japanese Chemical Society (issued by Maruzen Co. Ltd.).

[Porous Membrane]

The porous membrane according to the present invention has a molecular weight cut-off of 500,000 or less, preferably 500 to 500,000, more preferably 500 to 200,000, more preferably 500 to 100,000. The porous membrane may be a composite membrane having a plurality of layers. The porous membrane has generally an asymmetric membrane structure and is defined by a molecular weight cut-off when it is denser than an ultrafiltration membrane. An average pore diameter is not particularly limited, the superficial dense layer is a porous membrane having an average pore diameter of 50 nm or less and the average pore diameter is preferably 0.5 to 50 nm, more preferably 1 to 50 nm, more preferably 5 to 50 nm.

The porous membrane according to the present invention is preferably an ultrafiltration membrane, a reverse osmosis membrane or a nanofilter. In addition, the porous membrane is preferably asymmetric. By using a dense membrane having a small pore diameter as the superficial layer, excessive increase in membrane thickness of the separation-active membrane is inhibited. By forming an asymmetric structure in which a pore diameter of the lower layer part becomes large, permeation resistance is decreased and high permeability can be obtained without affecting separation.

The porous membrane used for the present invention is not particularly limited so long as it satisfies a molecular weight cut-off, mechanical strength and high gas permeability, may be a porous membrane made of any organic or inorganic substance and is preferably an organic polymer porous membrane.

The thickness of porous membrane is preferably 10 to 3000 μm, more preferably 50 to 500 μm, more preferably 50 to 200 μm. Within this range, preferred effects are exerted in terms of balance between permeability and mechanical strength. The thickness of superficial dense layer is 0.1 to 5 μm, more preferably 0.1 to 3 μm, and even more preferably 0.1 to 1 μm. When the pore diameter of the superficial dense layer of the porous membrane is excessively large, a casting solution to form the separation-active membrane described below can be readily permeated into the lower part and, as a result, the membrane thickness of separation-active membrane increases. In addition, when the pore diameter is excessively small, the casting solution cannot be readily permeated into the lower part and, as a result, the membrane thickness of separation-active membrane also increases. Accordingly, in the all cases, it is concerned that gas permeability may be deteriorated.

Regarding this fine pore structure of porous membrane, porosity is preferably 20 to 90%, more preferably 30 to 80%. In addition, the gas permeability is preferably $10^5$ cm$^3$(STP)/cm·sec·cmHg or more, based on carbon dioxide permeation rate.

Examples of the material for porous membrane include conventionally well-known polymers, including polyolefin-based resins such as polyethylene and polypropylene, fluorine-containing resins such as polytetrafluoroethylene, polyvinyl fluoride, polyvinylidene fluoride, and various resins such as polystyrene, cellulose acetate, polyurethane, polyacrylonitrile, polysulfone, polyethersulfone, polyimide and polyaramide and the material for porous membrane is preferably polysulfone, polyethersulfone, polyacrylonitrile, cellulose acetate or polyimide.

The shape of porous membrane may be any of plate, spiral, tubular and hollow fibers. In order to impart strength to these porous membranes, a non-woven fabric is preferably used.

[Method for Producing Gas Separation Membrane]

The gas separation membrane has further a porous membrane and can be produced by forming a separation-active membrane on at least the surface of the porous membrane. More preferably, the separation-active membrane can be formed by coating or dipping a composition containing a polymer having at least one repeating unit represented by Formulae (II-1) to (II-3) and at least one compound represented by Formula (I) on at least the surface of the porous membrane, and irradiating active radiation thereto or heat-curing. The separation-active membrane may be formed by irradiating active radiation or heating in a state in which a material to form the separation-active membrane is dissolved in various solvents. Any solvent may be used without particular limitation so long as it is capable of dissolving the material to form the separation-active membrane and examples of solvents include one, or a mixture of two or more, selected from water-soluble solvents or organic solvents such as water, methanol, ethanol, isopropyl alcohol, chloroform, methylene chloride, acetone, dioxane, methyl acetate, cyclohexanone, methylethyl ketone, acetonitrile, tetrachloroethylene, tetrahydrofuran, dimethylsulfoxide, dimethylformamide, dimethylacetamide and N-methylpyrrolidone.

In the gas separation membrane of the present invention, the formation of the separation-active membrane is preferably accomplished by coating a compound containing a polymer having at least one repeating unit represented by Formulae (II-1) to (II-3) and at least one compound represented by Formula (I) at least on the surface of a porous membrane. The method of coating is not particularly limited, is selected depending on the intended purpose and examples thereof include spin coating, bar coating, die coating, blade coating, air knife coating, gravure coating, roll coating, spray coating, dip coating, comma rolling, kiss coating, screen printing, inkjet printing and the like. Any solvent may be used without particular limitation so long as it is capable of dissolving the material for the separation-active membrane and examples thereof include one, or a mixture of two or more types selected from water-soluble solvents or organic solvents such as water, methanol, ethanol, isopropyl alcohol, chloroform, methylene chloride, acetone, dioxane, methyl acetate, cyclohexanone, methylethyl ketone, acetonitrile, tetrachloroethylene, tetrahydrofuran, dimethylsulfoxide, dimethylformamide, dimethylacetamide, N-methylpyrrolidone and the like.

The separation-active membrane preferably contains a polymerization initiator described below and is formed by curing a composition containing at least one polymer having a repeating unit represented by Formulae (II-1) to (II-3) and at least one compound represented by Formula (I) through irradiation of active radiation or heating. Here, the active radiation is not particularly limited so long as it produces an energy capable of generating initiation species in the membrane composition when irradiated and broadly includes α-ray, γ-ray, X-rays, ultraviolet rays, visible rays, electric beams and the like. Of these, ultraviolet rays and electric beams are preferred and ultraviolet rays are particularly preferred, in terms of curing sensitivity and easy availability of apparatuses.

The heat curing is preferably carried out by heating at 40° C. to 250° C., more preferably 40° C. to 180° C. The heating time is affected by used membrane material, concentration, initiator or amount of added cross-linking agent and is thus determined depending on temperature and time sufficient for forming membranes. The heating time is generally preferably 10 minutes to 24 hours, more preferably 1 hour to 12 hours. The heating may be carried out by using a variety of ovens, hot plates, air blowers or the like.

When ultraviolet rays are used in the present invention, addition of the following photopolymerization initiator is necessary. Electric beam curing is preferred since a polymerization initiator is unnecessary and a permeation depth is large. An electric beam accelerator may utilize a scanning manner, a double scanning manner or a curtain beam manner and is preferably a curtain beam manner capable of obtaining high power at a relatively low cost. Regarding properties of electric beam, an acceleration voltage is 30 to 1000 kV, preferably 50 to 300 kV. An absorbed dose is preferably 5 to 200 kGy (0.5 to 20 Mrad), more preferably 20 to 100 kGy (2 to 10 Mrad). When the acceleration voltage and absorbed amount are within these ranges, a sufficient amount of energy is permeated and energy efficiency is thus good. Regarding the atmosphere, at which an electric beam is irradiated, an oxygen concentration is preferably 200 ppm or less under a nitrogen atmosphere. Within this range, cross-linkage and curing are well performed around the surface.

A mercury lamp is used as a light source of ultraviolet rays. The mercury lamp utilizes a lamp of 20 to 240 W/cm$^2$ and is used at a speed of 0.3 to 20 m/min. The distance between the membrane and the mercury lamp is preferably generally 1 to 30 cm. When a desktop-type ultraviolet ray curing apparatus is used, curing is preferably performed after suitably controlling light amount and position of light source according to the material and environments for about 1 second to about 10 minutes.

Well-known radiation curing apparatuses, conditions and the like described in "UV-EB curing techniques" (issued by Technical Integration Center, Corp.) or "Application techniques of low-energy electric beam irradiation" (2000, issued by CMC Co., Ltd.) and the like may be used. Curing may be used in conjunction with heating.

[Polymerization Initiator]

In the process of forming separation activation of the present invention, a radical polymerization initiator is preferably added and a photopolymerization initiator is particularly preferably added.

The photopolymerization initiator of the present invention is a compound that causes chemical reaction via action of light or interaction with a sensitizing dye in an electron-excited state and thus produces at least one of radicals, acid and base.

The photopolymerization initiator may be appropriately selected from those having a sensitivity with respect to irradiated active radiation such as ultraviolet rays of 400 to 200 nm, far ultraviolet rays, g-rays, h-rays, i-rays, KrF excimer laser beam, ArF excimer laser beam, electron beam, X-rays, molecular beam or ion beam.

Specifically, the photopolymerization initiator may be selected from those well-known to those skilled in the art without limitation and specific examples thereof include the compounds described in Bruce M. Monroe et al., Chemical Review, 93, 435 (1993), R. S, Davidson, Journal of Photochemistry and biology A: Chemistry, 73.81 (1993), J. P. Faussier, "Photonitiated Polymerization—Theory and Applications": Rapra Review Vol. 9, Report, Rapra Technology (1998), and M. Tsunooka et al., Prog. Polym. Sci., 21,1 (1996). It is also possible to use the compounds for chemically amplified resists or photocation polymerization described in "Organic Materials for Imaging", edited by the Japanese Research Association for Organic Electronics Materials, published by Bunshin Design Printing Publishing and Digital Communications (1993), pp. 187-192. Further, compounds that cause bond cleavage in an acidic or basic manner via interaction with a sensitizing dye in an electron-excited state are also known, such as those described in F. D. Saeva, Topics in Current Chemistry, 156, 59 (1990), G. G. Maslak, Topics in Current Chemistry, 168, 1 (1993), H. B. Shuster et al., JACS, 112, 6329 (1990), and I. D. F. Eaton et al., JACS, 102, 3298 (1980).

Preferred examples of the photopolymerization initiator include (a) aromatic ketones, (b) aromatic onium salt compounds, (c) organic peroxides, (d) hexaaryl biimidazole compounds, (e) ketoxime ester compounds, (f) borate compounds, (g) azinium compounds, (h) metallocene compounds, (i) active ester compounds, and (j) compounds having a carbon-halogen bond and the like Examples of (a) aromatic ketone compounds include the compounds having a benzophenone skeleton or a thioxanthone skeleton described in J. P. Fouassier and J. F. Rabek, Radiation Curing in Polymer Science and Technology (1993), pp. 77-117. Preferred examples of (a) aromatic ketone compounds include α-thiobenzophenone compounds described in Examined Japanese Patent Application Publication No. 47-6416, benzoin ether compounds described in Examined Japanese Patent Application Publication No. 47-3981, α-substituted benzoin compounds described in Examined Japanese Patent Application Publication No. 47-22326, benzoin derivatives described in Examined Japanese Patent Application Publication No. 47-23664, aroyl phosphonates ester described in JP-A-57-30704, dialkoxy-benzophenones described in Examined Japanese Patent Application Publication No. 60-26483, benzoin ethers described in Examined Japanese Patent Application Publication No. 60-26403 and JP-A-62-81345, α-aminobenzophenones described in Examined Japanese Patent Application Publication No. 1-34242, U.S. Pat. No. 4,318,791 and European Patent Application Publication No. 0284561A1, p-di (dimethylaminobenzoyl)benzenes described in JP-A-2-211452, thio-substituted aromatic ketones described in JP-A-61-194062, acylphosphinesulfide described in Examined Japanese Patent Application Publication No. 2-9597, acylphosphine described in Examined Japanese Patent Application Publication No. 2-9596, thioxanthones such as Examined Japanese Patent Application Publication No. 63-61950, and coumarins described in Examined Japanese Patent Application Publication No. 59-42864.

The (b) aromatic omium salts include aromatic omium salts of elements of Groups V, VI and VII of the periodic table, and more specifically, N, P, As, Sb, Bi, O, S, Se, Te or I. Preferred examples of (b) aromatic omium salts include: iodonium salts described in the specification of European Patent No. 104143, the specification of U.S. Pat. No. 4,837,124, JP-A-2-150848 and JP-A-2-96514; sulfonium salts described in the respective specifications of European Patent No. 370693, European Patent No. 233567, European Patent No. 297443, European Patent No. 297442, European Patent No. 279210, European Patent No. 422570, U.S. Pat. No. 3,902,144, U.S. Pat. No. 4,933,377, U.S. Pat. No. 4,760,013, U.S. Pat. No. 4,734,444 and U.S. Pat. No. 2,833,827; diazonium salts (such as benzene diazonium which may contain a substituent); resins of diazonium salts (such as formaldehyde resins of diazo diphenylamine); N-alkoxy pyrridium salts (such as those described in the specification of U.S. Pat. No. 4,743,528, and the respective pamphlets of JP-A-63-138345, JP-A-63-142345, JP-A-63-142346 and JP-A-46-42363, and more specifically, 1-methoxy-4-phenyl pyrridium tetrafluoroborate); or compounds such as those described in the respective pamphlets of Examined Japanese Patent Application Publication No. 52-147277, Examined Japanese Patent Application Publication No. 52-14278 and Examined Japanese Patent Application Publication No. 52-14279. These salts produce radicals or acids as the active species.

The (c) "organic peroxides" described above include almost all organic compounds having one or more oxygen-oxygen bonds in the molecule, and preferred examples thereof include peroxide esters such as: 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, di-t-butyl di-peroxy isophthalate, and the like.

Examples of the (d) hexaaryl biimidazoles mentioned above include lophine dimers described in Examined Japanese Patent Application Publication No. 45-37377 and Examined Japanese Patent Application Publication No. 44-86516, such as: 2,2'-bis(o-chlorophenyl)-4,4',5,5'-tetraphenyl biimidazole; 2,2'-bis(o-bromophenyl)-4,4',5,5'-tetraphenyl biimidazole; 2,2'-bis(o,p-dichloro-phenyl)-4,4',5,5'-tetraphenyl biimidazole; 2,2'-bis(o-chlorophenyl)-4,4',5,5'-tetra-(m-methoxyphenyl)biimidazole; 2,2'-bis(o,o'-dichloro-phenyl)-4,4',5,5'-tetraphenyl biimidazole; 2,2'-bis(o-nitrophenyl)-4,4',5,5'-tetraphenyl biimidazole; 2,2'-bis(o-methyl-phenyl)-4,4',5,5'-tetraphenyl biimidazole; and 2,2'-bis(o-trifluorophenyl)-4,4',5,5'-tetraphenyl biimidazole, and the like.

Examples of the (e) ketoxium esters include 3-benzoyloxy-iminobutan-2-one, 3-acetoxy-iminobutan-2-one, 3-propionyloxy-iminobutan-2-one, 2-acetoxy-iminopentan-3-one, 2-acetoxyimino-1-phenylpropan-1-one, 2-benzoyloxy-imino-1-phenylpropan-1-one, 3-p-toluene sulfonyloxy iminobutan-2-one, and 2-ethoxycarbonyl oxyimino-1-phenyl-propan-1-one, and the like.

Examples of the (f) borate salts as other examples of photopolymerization initiators compounds that can be used in the present invention are the compounds described in the respective specifications of U.S. Pat. No. 3,567,453, U.S. Pat. No. 4,343,891, European Patent No. 109772 and European Patent No. 109773.

Examples of the (g) azinium compounds, as other examples of photopolymerization initiators, include compounds having N—O bonds described in the respective pamphlets of JP-A-63-138345, JP-A-63-142345, JP-A-63-142346, JP-A-63-143537 and Examined Japanese Patent Application Publication No. 46-42363.

Examples of the (h) metallocene compounds, as other examples of photopolymerization initiators, include titanocene compounds as described in the respective pamphlets of JP-A-59-152396, JP-A-61-151197, JP-A-63-41484, JP-A-2-249, and JP-A-2-4705, and iron-arene complexes described in the respective pamphlets of JP-A-1-304453 and JP-A-1-152109.

Specific examples of the aforementioned titanocene compound include: di-cyclopentadienyl-Ti-di-chloride; di-cyclopentadienyl-Ti-bis-phenyl; di-cyclopentadienyl-Ti-bis-2,3,4,5,6-pentafluorophen-1-yl; di-cyclopentadienyl-Ti-bis-2,3,5,6-tetrafluorophen-1-yl; di-cyclopentadienyl-Ti-bis-2,4,6-trifluorophen-1-yl; di-cyclopentadienyl-Ti-bis-2,6-difluorophen-1-yl; di-cyclopentadienyl-Ti-bis-2,4-difluorophen-1-yl; di-methyl-cyclopentadienyl-Ti-bis-2,3,4,5,6-pentafluorophen-1-yl; di-methyl-cyclopentadienyl-Ti-bis-2,3,5,6-tetrafluorophen-1-yl; di-methyl-cyclopentadienyl-Ti-bis-2,4-difluorophen-1-yl; bis(cyclopentadienyl)-bis(2,6-difluoro-3-(pyr-1-yl)phenyl)titanium; bis(cyclopentadienyl)bis[2,6-difluoro-3-(methyl-sulfonamide)phenyl]titanium;
and bis(cyclopentadienyl)bis[2,6-difluoro-3-(N-butyl biaroyl-amino)phenyl]titanium, and the like.

Examples of the (i) active ester compounds include nitrobenzyl ester compounds described in the respective specifications of European Patent No. 0290750, European Patent No. 046083, European Patent No. 156153, European Patent No. 271851 and European Patent No. 0388343, the respective specifications of U.S. Pat. No. 3,901,710 and U.S. Pat. No. 4,181,531, and the respective pamphlets of JP-A-60-198538, and JP-A-53-133022; iminosulfonate compounds described in the respective specifications of European Patent No. 0199672, European Patent No. 84515, European Patent No. 199672, European Patent No. 044115, and European Patent No. 0101122, the respective specifications of U.S. Pat. No. 4,618,564, U.S. Pat. No. 4,371,605, and U.S. Pat. No. 4,431,774, and the respective pamphlets of JP-A-64-18143, JP-A-2-245756, and JP-A-4-365048; and compounds described in the respective pamphlets of JP-A-62-6223, JP-A-63-14340 and JP-A-59-174831.

Preferred examples of the (j) compounds containing an oxygen halogen bond include: a compound as described by Wakabayashi, et al., in Bull. Chem. Soc. Japan, 42, 2924 (1969), a compound described in the specification of GB Patent No. 1388492, a compound described in the pamphlet of JP-A-53-133428, a compound as described in the specification of German Patent No. 3337024, and the like.

Other examples include a compound described by F. C. Schaefer, et. al., in J. Org. Chem., 29, 1527 (1964), a compound described in the pamphlet of JP-A-62-58241, a compound described in the pamphlet of JP-A-5-281728, and the like. Other examples include a compound described in the specification of German Patent No. 2641100, a compound described in the specification of German Patent No. 3333450, a group of compounds described in the specification of German Patent No. 3021590, a group of compounds described in the specification of German Patent 3021599 and the like.

The amount of used polymerization initiator is preferably 0.01% by mass to 10% by mass, more preferably 0.1% by mass to 5% by mass, based on the amount of the polymerizable compound.

[Cosensitizer]

A known compound having a function of further improving sensitivity or suppressing polymerization inhibition due to oxygen may be added as a cosensitizer in the process of producing the separation-active membrane.

Examples of the cosensitizer include amines such as the compounds described in M. R. Sander et al., Journal of Polymer Society, Vol. 10, p. 3173 (1972), the pamphlet of Examined Japanese Patent Application Publication No. 44-20189, the pamphlet of JP-A-51-82102, the pamphlet of JP-A-52-134692, the pamphlet of JP-A-59-138205, the pamphlet of JP-A-60-84305, the pamphlet of JP-A-62-18537, the pamphlet of JP-A-64-33104 and Research Disclosure Vol. 33825. Specific examples include triethanolamine, p-dimethylaminobenzoic acid ethyl ester, p-formyldimethylaniline and p-methylthiodimethylaniline.

Other cosensitizers include thiols and sulfides, such as thiol compounds described in the respective pamphlets of JP-A-53-702, Examined Japanese Patent Application Publication No. 55-500806 and JP-A-5-142772 and disulfide compounds described in the pamphlet of JP-A-56-75643. Specific examples include 2-mercaptobenzothiazole, 2-mercaptobenzoxazole, 2-mercaptobenzimidazole, 2-mercapto-4(3H)-quinazoline, β-mercaptonaphthalene and the like Other examples of cosensitizers include amino acid compounds (such as N-phenylglycine), organic metal compounds (such as tributyltin acetate) described in the pamphlet of Examined Japanese Patent Application Publication No. 48-42965, hydrogen donors described in the pamphlet of Examined Japanese Patent Application Publication No. 55-34414, sulfur compounds (such as trithian) described in the pamphlet of JP-A-6-308727, phosphorous compounds (such as diethyl phosphite) described in the pamphlet of JP-A-6-250387, Si—H, Ge—H compounds described in the pamphlet of Japanese Patent Application No. 6-191605 and the like.

[Physical Properties]

The separation-active membrane may contain a variety of polymer compounds in order to adjust membrane physical properties. Examples of polymer compounds include acryl-based polymers, polyurethane resins, polyamide resins, polyester resins, epoxy resins, phenol resins, polycarbonate resins, polyvinyl butyral resins, polyvinyl formal resins, shelac, vinyl-based resins, acryl-based resins, rubber-based resins, waxes, and other natural resins. These resins may be used alone or in combination of two or more kinds thereof.

[Plasticizer]

The separation-active membrane may contain a plasticizer in order to impart plasticity.

Examples of the plasticizer include dioctyl phthalate, didodecyl phthalate, triethylene glycol dicaprylate, methyl glycol phthalate, tricresyl phosphate, dioctyl adipate, dibutyl sebacate, triacetyl glycerin and the like. Other examples of the plasticizer include polyethylene glycol, polypropylene glycol (monool type or diol type), polypropylene glycol (monool type or diol type) and ion liquids (for example, tetraammonium salts, imidazolium salts, phosphonium salts and the like).

The plasticizer has a function of making membranes flexible and should have good compatibility with the polymer constituting the separation-active membrane. In general, a compound having high hydrophilicity has good compatibility with the polymer. Of compounds having high hydrophilicity, a compound having a structure alternately containing a hydrophilic group and a hydrophobic group, for example, an ether compound containing a hetero atom in a straight chain or a secondary amine is preferably used. This is because the existence of hydrophilic group, such as —O— or —NH—, expresses compatibility with PVA and a derivative thereof and the hydrophobic group other than the hydrophilic group weakens the intermolecular force of PVA and a derivative thereof to act for increase in the flexibility.

Also, a compound having a small number of hydroxy groups capable of forming a hydrogen bond between polyvinyl alcohol and derivatives thereof is preferably used. Examples of such compound include ethylene glycol, propylene glycol and a dimer, a trimer, a homomultimer or a comultimer including tetramer or more thereof and a secondary amine, for example, diethanolamine or dimethylolamine. Among them, ethylene glycols (including monomer, dimer, trimer and multimer) which have small steric hindrance, are excellent in compatibility and have lower toxicity are particularly preferably used as the plasticizer.

Ethylene glycols are roughly divided into three classes depending on the molecular weight thereof. The first class includes ethylene glycol which is a monomer. The second class includes diethylene glycol which is a dimer and triethylene glycol which is a trimer. The third class includes polyethylene glycol including a tetramer or more. The polyethylene glycols are broadly classified into liquid polyethylene glycols having a molecular weight of 200 to 700 and solid polyethylene glycols having a molecular weight of 1,000 or more. The polyethylene glycols are often marketed under trade names indicating the average molecular weight thereof in the suffix position.

As the plasticizer has a lower molecular weight, it has the larger effect of rendering the resin flexible. For this reason, particularly, ethylene glycol in the first class, diethylene glycol and triethylene glycol in the second group and tetraethylene glycol (tetramer) included in the third class are preferably used. Among them, diethylene glycol, triethylene glycol and tetraethylene glycol are more preferably used as the plasticizer from a viewpoint of lower toxicity and excellent handling property because of free from extraction from the resin composition. Mixtures of two or more thereof are also preferably used.

[Surfactant]

In addition, a nonionic surfactant, a cationic surfactant, an organic fluoro surfactant or the like may be added in order to adjust liquid physical properties.

Specific examples of the surfactant include anionic surfactants such as alkylbenzene sulfonate, alkyl naphthalene sulfonate, higher fatty acid salts, sulfonate of higher fatty acid ester, ester sulfate of higher alcohol ether, sulfonates of higher alcohol ether, alkylcarboxylates of higher alkylsulfone amide and alkylphosphates, nonionic surfactants such as polyoxyethylene alkyl ether, polyoxyethylene alkyl phenyl ether, polyoxyethylene fatty acid ester, sorbitan fatty acid ester, ethylene oxide adducts of acetylene glycol, ethylene oxide adducts of glycerin, polyoxyethylene sorbitan fatty acid ester and the like. Other examples include amphoteric surfactants such as alkyl betaine or amide betaine, silicone-based surfactants, fluorine-based surfactants and the like. The surfactant may be suitably selected from conventionally known surfactants and derivatives thereof.

[Dispersant]

Specific examples of polymer dispersants include polyvinyl pyrrolidone, polyvinyl alcohol, polyvinyl methylether, polyethylene oxide, polyethylene glycol, polypropylene glycol, polyacryl amide and the like. Among them, polyvinyl pyrrolidone is preferably used.

As monomers corresponding to a repeating unit represented by Formulae (II-1) to (II-3), oligomers or prepolymers may be used. The polymers to obtain polymer compounds may be any one of block copolymers, random copolymers, graft copolymers or the like. Block copolymers or graft copolymers are particularly preferred in terms of viscosity and compatibility.

The molecular weight of the polymer containing a repeating unit represented by Formulae (II-1) to (II-3) is not particularly limited because a cross-linkage membrane is used. The monomers corresponding to a repeating unit have preferably a number average molecular weight of 300 to 1,000,000, more preferably 300 to 500,000, even more preferably 1,000 to 200,000.

The conditions to form the separation-active membrane are not particularly limited, but the temperature is preferably −30 to 100° C., more preferably −10 to 80° C., even more preferably 5 to 50° C.

In the present invention, gas such as air or oxygen may be present during formation of membrane, but the formation is preferably performed under an inert gas atmosphere.

In addition, water or an organic solvent may be added as a medium used for forming the separation-active membrane. Specifically, organic solvents to be used are not particularly limited, but hydrocarbon-based organic solvents such as n-hexane and n-heptane; ester-based organic solvents such as methyl acetate, ethyl acetate, butyl acetate; lower alcohols such as methanol, ethanol, n-propanol, isopropanol, n-butanol, isobutanol and tert-butanol; aliphatic ketones such as acetone, methyl ethyl ketone, methyl isobutyl ketone and diacetone alcohol; ether-based organic solvents such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl butyl ether and tetrahydrofuran; N-methylpyrrolidone, 2-pyrrolidone, dimethylformamide, dimethyl imidazolidinone, dimethyl sulfoxide, dimethyl acetamide and the like. These compounds may be used alone or in combination of two or more types.

The amount of used solvent is preferably 0.1- to 50-fold by mass, more preferably 0.5- to 20-fold by mass, particularly preferably 1- to 15-fold by mass, with respect to the total solid of the composition constituting the separation-active membrane.

[Thickening Agent]

In addition, when a separation-active membrane is formed, a compound, so-called "thickening agent" to adjust a viscosity may be added to enable the membrane to be more evenly and thinly coated. Specifically, examples of thickening agents to be used include, but are not particularly limited to, alcohol-based compounds such as ethylene glycol, diethylene glycol and glycerin, or cellulose-based compounds, or thickening agents such as polyalkylene oxide, polyamide and the like. These compounds may be used alone or in combination of two or more types.

The content of thickening agent is preferably 0.01 to 30% by mass, more preferably 0.1 to 10% by mass, based on the total solid of the composition constituting the separation-active membrane.

[Gas Separation Membrane]

The gas separation membrane of the present invention further has a porous membrane. A separation-active membrane may be formed on the surface and inner surface of the porous membrane and is preferably formed at least on the surface and used as the gas separation membrane. By forming a separation-active membrane at least on the surface of the porous membrane, a gas separation membrane that has advantages of high separation selectivity and high gas permeability, furthermore, mechanical strength can be obtained. Regarding the membrane thickness of the separation layer, the membrane is preferably as thin as possible under conditions to provide superior gas permeability while maintaining mechanical strength and separation selectivity.

Here, separation selectivity of the gas separation membrane of the present invention means a value obtained through division of gas permeability of first gas and gas permeability of second gas at a specific temperature when the first gas and the second gas are separated, which can be obtained by the following equation. As value of separation selectivity becomes larger, separation selectivity of gas separation membrane becomes superior.

Separation selectivity of first gas/second gas=(first gas permeability)/(second gas permeability)

In this application, separation selectivity of $CO_2$ and $H_2$ at 25° C. obtained in accordance with the following equation is preferably 100 or more, more preferably 200 or more. The separation selectivity of $CO_2$ and $H_2$ at 100° C. is preferably 100 or more, more preferably 150 or more, even more preferably 200 or more. As the upper limit becomes larger, separation performance of the membrane is superior and the upper limit is not particularly limited, but is 5,000, preferably 1,000 or less. Through balance with gas permeability, it is preferred that suitable separation selectivity is exerted.

Separation selectivity of $CO_2/H_2$=($CO_2$ gas permeability)/($H_2$ gas permeability)

Regarding the gas separation membrane of the present invention, the membrane thickness of the separation-active membrane is preferably 0.01 to 100 μm, more preferably 0.1 to 20 μm, even more preferably 0.1 to 10 μm. When the pore diameter of porous membrane is large, permeation into the lower part of porous membrane is easy when the separation-active membrane is formed. For this reason, when the separation-active membrane is formed as a thin layer, formation of membrane is non-uniform and pin holes are readily generated. Since, in the present invention, the pore diameter of porous membrane is small, permeation into the lower part of porous membrane is inhibited when a separation-active membrane is formed, pin holes are not readily generated and separation membrane with superior gas permeability can be provided even in a case where the membrane has an equivalent thickness to that of a case in which a support with a large pore diameter is used.

A ratio of the porous membrane and the separation-active membrane is not particularly limited, but the separation-active membrane is preferably as thin as possible from a viewpoint of exhibiting permeability and separation selectivity. The membrane thickness of separation-active membrane is preferably 0.001 to 50%, more preferably 0.01 to 10%, more preferably 0.1 to 5%, with respect to the thickness of the porous membrane. As the composition ratio of repeating units having a plurality of cross-linkage structures as shown in Formula (II-2) in the separation-active membrane is increased, effects of molecular structures become great, but strength and separation selectivity of membrane are roughly improved and gas permeability is deteriorated. Accordingly, the composition ratio is preferably used based on 1 to 50% by mass, preferably 5 to 30% by mass, but the present invention is not limited to this range, and gas permeability and separation selectivity can be adjusted by changing the composition ratio depending on the purpose of gas separation (recovery ratio, purity or the like).

The configuration of preferred ranges of the gas separation membrane of the present invention will be described. The gas separation membrane of the present invention is preferably a case in which a separation-active membrane having: a membrane thickness of 0.01 to 100 μm is formed at least on the surface of a porous membrane having a cut-off molecular weight of 500 to 500,000 by using a polymer containing at least one repeating unit represented by Formula (I) and at least one repeating unit represented by Formulae (II-1) to (II-3); and the membrane containing organic amine with a molecular weight of 100 to 150,000, or a case in which a separation-active membrane having: a membrane thickness of 0.01 to 100 μm is formed at least on the surface of the porous membrane having a cut-off molecular weight of 500 to 500,000 by using a copolymer containing at least one repeating unit represented by Formula (IV) and at least one repeating unit represented by Formula (V); and the membrane containing organic amine with a molecular weight of 100 to 150,000.

More preferably, the gas separation membrane of the present invention is a case in which a separation-active membrane having: a membrane thickness of 0.1 to 20 μm is formed at least on the surface of a porous membrane having a cut-off molecular weight of 500 to 200,000 by using a polymer containing at least one repeating unit represented by Formula (I) and at least one repeating unit represented by Formulae (II-1) to (II-3); and the membrane containing organic amine with a molecular weight of 100 to 100,000, or a case in which a separation-active membrane having a membrane thickness of 0.1 to 20 μm is formed at least on the surface of the porous membrane having a cut-off molecular weight of 500 to 200,000 by using a copolymer containing at least one repeating unit represented by Formula (IV) and at least one repeating unit represented by Formula (V); and the membrane containing organic amine with a molecular weight of 100 to 100,000.

Even more preferably, the gas separation membrane of the present invention is a case in which a separation-active membrane having: a membrane thickness of 0.1 to 10 μm is formed at least on the surface of a porous membrane having a cut-off molecular weight of 500 to 50,000 by using a polymer containing at least one repeating unit represented by Formula (I) and at least one repeating unit represented by Formulae (II-1) to (II-3); and the membrane containing organic amine with a molecular weight of 100 to 5,000, or in which a separation-active membrane having a membrane thickness of 0.1 to 10 μm is formed at least on the surface of a porous membrane having a cut-off molecular weight of 500 to 100,000 by using a polymer containing at least one repeating unit represented by Formulae (II-1) to (II-3); and the membrane containing organic amine with a molecular weight of 100 to 5,000.

[Method for Separating Gas Mixture]

The method for separating a gas mixture according to the present invention is a method for separating at least one acid gas from a mixed gas containing the at least one acid gas and at least one non-acid gas. The method is a method for separating a gas mixture using the gas separation membrane of the present invention wherein the acid gas is at least one selected from carbon dioxide, hydrogen sulfide, carbonyl sulfide, sulfur oxide (SOx) and nitrogen oxide (NOx) and the non-acid gas is at least one selected from hydrogen, methane, nitrogen and carbon monoxide. The acid gas is preferably carbon dioxide or hydrogen sulfide.

In the method for separating gas using the gas separation membrane of the present invention, the components of gas mixture of raw materials are not affected by the origin, application or used environments and are not particularly restricted, but main components of the gas mixture are preferably carbon dioxide and methane or carbon dioxide and hydrogen. That is, the ratio of carbon dioxide and methane or carbon dioxide and hydrogen in the gas mixture is preferably 5 to 50%, more preferably 10 to 40%, with respect to carbon dioxide. When the gas mixture is present together with an acid gas such as carbon dioxide or hydrogen sulfide, a method for separating gas using the gas separation membrane of the present invention exerts considerably superior performance, preferably exerts superior performance for separation of carbon dioxide and hydrocarbon such as methane, carbon dioxide and nitrogen, carbon dioxide and hydrogen.

[Gas Separation Membrane Module•Gas Separation Apparatus]

The gas separation membrane of the present invention is a composite membrane in which a porous membrane is combined with a separation-active membrane and a gas separation membrane module using the same is preferred. In addition, an apparatus having means for separating and recovering or separating and purifying gas by using the gas separation membrane or gas separation membrane module of the present invention may be used.

The gas separation membrane of the present invention is preferably used in the form of a module. Examples of the module include spiral, hollow, pleat, tubular, plate and frame types and the like. In addition, the gas separation membrane of the present invention may be applied to an apparatuses for separating and recovering gas using a membrane/absorption hybrid method in conjunction with an absorption solution, for example, as described in JP-A-2007-297605.

The gas separation membrane of the present invention having superior properties described above is preferably used for a gas separation recovery method or a gas separation purification method.

EXAMPLES

Hereinafter, the present invention will be described in more detail with reference to examples, but the present invention is not limited to these examples. In addition, "part" and "%" is based on mass, unless otherwise particularly described.

Example 1

2.8 g of methacrylic acid (produced by Wako Pure Chemical Industries Ltd., M-1), 1.2 g of polyethylene glycol dimethacrylate (produced by Sigma-aldrich Co., Ltd., product number: 43, 746-8, Mn=875, M-23) were mixed in a 30 ml brown vial bottle and stirred for 30 minutes, 0.04 g of 1-hydroxycyclohexyl phenyl ketone (produced by Sigma-aldrich Co., Ltd., product number: 40, 561-2) was further added thereto, and the resulting mixture was further stirred for 30 minutes. The monomer compound was immersed in a region in which a porous hydrophilic polytetrafluoroethylene (PTFE) membrane (hydrophilic Omnipore (registered trademark), produced by Millipore Corp., pore diameter: 0.1 μm) was placed on a glass plate with a size of 10 cm×10 cm, the membrane was inserted between the glass plate and another glass plate with a size of 10 cm×10 cm and was then pressed, to remove foams present in the membrane. The monomer-immersed PTFE membrane inserted between the two glass plates was exposed to light at 60 mW for 60 seconds by using a UV irradiator (EXECURE 3000), manufactured by HOYA Corp. Then, the glass plates were put out and immersed in methanol, and the glasses were isolated from the PTFE composite membrane. The resulting membrane was immersed in 30 g of an aqueous 50 wt % polyethyleneimine 1200 (B-1) (produced by Junsei Chemical Co., Ltd.) solution and allowed to stand overnight. The thickness of obtained PTFE composite membrane was measured with an electric micrometer (manufactured by Anritsu Corporation, K-402B) (40 μm), and gas permeability of hydrogen ($H_2$)/carbon dioxide ($CO_2$)=80/20(vol %) was measured at a relative humidity of 90% and under different temperatures and pressures by using a gas permeability meter (manufactured by GTR TEC Corporation, GTR-10XF), the values of the permeability were divided and separation selectivity was compared.

Comparative Example 1

1 g of a PAMAM amine dendrimer (20% methanol solution, produced by Sigma-aldrich Co., Ltd., 41, 236-8), 0.25 g of trimethylol propane trimethacrylate (hereinafter, simply referred to as "TMPTMA"), and 0.75 g (1.0 mmol) of polyethylene glycol dimethacrylate (produced by Sigma-aldrich Co., Ltd., product number: 43, 746-8, Mn=875, M-23) were dissolved in 2 g of methanol with reference to JP-A-2009-241006. Subsequently, triethanol amine and 1-hydroxycyclohexyl phenyl ketone were added at amounts of 0.8 mmol/mL and 0.04 mmol/ml, respectively, to obtain a casting solution. A polyether sulfone support membrane was placed on a petri dish, the casing solution was spread on the petri dish and photo-cured by exposure to light at 60 mW for 5 minutes under a nitrogen atmosphere by using a UV irradiator (EXECURE 3000) manufactured by HOYA Corp., to obtain a target polymer membrane (membrane thickens: 405 μm).

Examples 2 to 17, Comparative Examples 2 to 5

Membranes were produced in the same manner as above, except that M-1, M-23 and B-1 in Example 1, and TMPTMA, M-23 and PAMAM amine dendrimers in Comparative Example 1 were changed into the compounds and composition ratios shown in Table below.

TABLE 1

|  | Comp. 1 | Comp. 2 | Comp. 3 | Comp. 1/comp. 2/comp. 3 (mass ratio: mass/% by mass) | Formula (I) | Boiling point or decomposition temperature (° C.) | [(Total molecular weight of primary amine group + total molecular weight of secondary amine group)]/ (total molecular weight of Formula (I)) |
|---|---|---|---|---|---|---|---|
| Example 1 | M-1 | M-23 | — | 70/30/0 | B-1 | >200 | 038 |
| Example 2 | M-2 | M-23 | — | 50/50/0 | B-1 | >200 | 038 |

TABLE 1-continued

|  | Comp. 1 | Comp. 2 | Comp. 3 | Comp. 1/comp. 2/comp. 3 (mass ratio: mass/% by mass) | Formula (I) | Boiling point or decomposition temperature (° C.) | [(Total molecular weight of primary amine group + total molecular weight of secondary amine group)]/ (total molecular weight of Formula (I)) |
|---|---|---|---|---|---|---|---|
| Example 3 | M-11 | M-23 | — | 80/20/0 | B-1 | >200 | 038 |
| Example 4 | M-17 | M-23 | — | 30/70/0 | B-1 | >200 | 0.38 |
| Example 5 | M-18 | M-23 | — | 50/50/0 | B-1 | >200 | 038 |
| Example 6 | M-20 | M-23 | — | 50/50/0 | B-1 | >200 | 038 |
| Example 7 | M-1 | M-21 | — | 70/30/0 | B-1 | >200 | 038 |
| Example 8 | M-1 | M-24 | — | 70/30/0 | B-1 | >200 | 038 |
| Example 9 | M-1 | M-26 | — | 90/10/0 | B-1 | >200 | 038 |
| Example 10 | M-1 | M-23 | M-31 | 40/40/20 | B-1 | >200 | 038 |
| Example 11 | M-1 | M-30 | M-40 | 35/35/30 | B-1 | >200 | 038 |
| Example 12 | M-1 | M-46 | — | 70/30/0 | B-1 | >200 | 038 |
| Example 13 | M-1 | M-47 | — | 70/30/0 | B-1 | >200 | 038 |
| Example 14 | M-1 | M-23 | — | 70/30/0 | B-2 | 209 | 046 |
| Example 15 | M-1 | M-23 | — | 70/30/0 | B-3 | >200 | 039 |
| Example 16 | M-1 | M-23 | — | 70/30/0 | B-4 | 244 | 030 |
| Example 17 | M-1 | M-23 | — | 70/30/0 | B-7 | 149 (melting point) | 035 |
| Comparative Example 1 | TMPTMA | M-24 | — | 25/75/0 | PAMAM amine dendrimer | >200 | 0.12 |
| Comparative Example 2 | TMPTMA | M-25 | — | 25/75/0 | Ethylene diamine | 117 | 0.53 |
| Comparative Example 3 | TMPTMA | M-26 | — | 25/75/0 | PAMAM amine dendrimer | >200 | 0.12 |
| Comparative Example 4 | TMPTMA | M-23 | M-31 | 40/40/20 | Ethylene diamine | 117 | 0.53 |
| Comparative Example 5 | TMPTMA | M-23 | — | 70/30/0 | B-3 | >200 | 0.39 |

B-2: Product number: D0493, produced by Tokyo chemical Industry Co., Ltd.,
B-3: [PVAM0595B] produced by Mitsubishi chemical Co., Ltd.
B-4: Product number: A0299, produced by Tokyo chemical Industry Co., Ltd.,
B-7: Product number: H1070, produced by Tokyo chemical Industry Co., Ltd.,
Ethylenediamine: produced by Wako Pure Chemical Industries Ltd., product number: 053-00936

Comparative Example 6

20 g of water was added to 1 g of a polyvinylalcohol/polyacrylic acid copolymer (produced by Sumitomo Seika Chemicals Co., Ltd., water-permeable resin SS gel), followed by stirring at room temperature to dissolve the gel. Then, 0.136 g of glutaraldehyde (25% aqueous solution) was added thereto, followed by stirring at a temperature of 95° C. for 15 hours. Also, 2.33 g of cesium carbonate was further added thereto, followed by further stirring at room temperature to obtain a casting solution. Hydrophilic PVDF (produced by Millipore Corp., hydrophilic Durapore pore diameter: 0.1 μm, diameter: 47 mm) was stacked on hydrophobic PVDF (produced by Millipore Corp., hydrophobic Durapore, pore diameter: 0.22 μm, diameter: 47 mm) on an even and clean glass plate with a size of 10 cm×10 cm, and the casting solution was coated by using an applicator and dried in air overnight. Then, thermal-crosslinkage was performed at 120° C. for 2 hours to obtain a composite membrane for gas separation membrane. The membrane thickness measured was 220 μm.

Comparative Example 7

With reference to U.S. Pat. No. 3,506,793, water was added to a PAA (polyacrylic acid) powder (produced by Wako Pure Chemical Industries Ltd.) having an average molecular weight of 2,000 to prepare 10% by mass of a solution, and ethylene diamine was added so as to be the same equivalents as carboxyl group of PAA to obtain a casting solution. The casting solution was coated to hydrophilic PVDF (produced by Millipore Corp., hydrophilic Durapore pore diameter: 0.1 μm, diameter: 47 mm) using an applicator and dried in air overnight to obtain a composite membrane for gas separation membrane. The measured membrane thickness was 110 μm.

[Variation in Weight and Gas Separation Selectivity Under Elevated Temperature and Elevated Humidity Conditions (80° C., 80% Humidity)]

Membrane samples of Examples 1 to 17 and Comparative Examples 1 to 5 were placed on filter paper, stored under elevated temperature and elevated humidity conditions (80° C., 80% humidity) for 48 hours and dried under vacuum, and variations in weight was recorded. In addition, gas permeability measurement test of the membrane was performed and gas separation selectivity was compared under elevated temperature and elevated humidity conditions (40° C., RH 90%).

TABLE 2

|  | Variation in weight (%)s | $CO_2/H_2$ gas separation selectivity | |
|---|---|---|---|
|  |  | Before storage | After storage |
| Example 1 (the present invention) | −1.1 | 152 | 138 |
| Example 2 (the present invention) | −1.4 | 128 | 115 |
| Example 3 (the present invention) | −2.6 | 159 | 145 |
| Example 4 (the present invention) | −0.7 | 143 | 112 |
| Example 5 (the present invention) | −1.4 | 138 | 125 |
| Example 6 (the present invention) | −1.3 | 126 | 102 |
| Example 7 (the present invention) | −2.1 | 139 | 112 |

TABLE 2-continued

| | Variation in weight (%)s | CO$_2$/H$_2$ gas separation selectivity | |
|---|---|---|---|
| | | Before storage | After storage |
| Example 8 (the present invention) | −1.9 | 120 | 108 |
| Example 9 (the present invention) | −1.3 | 161 | 149 |
| Example 10 (the present invention) | −2.3 | 133 | 117 |
| Example 11 (the present invention) | −4.5 | 141 | 124 |
| Example 12 (the present invention) | −2.0 | 136 | 113 |
| Example 13 (the present invention) | −3.3 | 131 | 119 |
| Example 14 (the present invention) | −1.2 | 138 | 126 |
| Example 15 (the present invention) | −1.3 | 150 | 137 |
| Example 16 (the present invention) | −1.1 | 123 | 104 |
| Example 17 (the present invention) | −1.3 | 125 | 109 |
| Comparative Example 1 | −12 | 86 | 33 |
| Comparative Example 2 | −30 | 79 | 20 |
| Comparative Example 3 | −44 | 85 | 15 |
| Comparative Example 4 | −48 | 83 | 12 |
| Comparative Example 5 | −41 | 75 | 15 |
| Comparative Example 6 | −11 | 66 | 37 |
| Comparative Example 7 | −4.1 | 45 | 15 |

The materials of Comparative Examples exhibits great decrease in variation after stored under elevated temperature and elevated humidity conditions and left the trace of elution of carrier on the filter paper, but the separation membrane of the present invention exhibits little decrease in weight. In addition, it can be seen that the gas separation membrane of the present invention can inhibit deterioration in gas separation selectivity under elevated temperature and elevated humidity conditions and has heat resistance.

[Variation in Weight and Gas Separation Selectivity Under Elevated Temperature and Elevated Pressure Conditions]

Membranes of Examples 1 to 17 and Comparative Examples 1 to 7 were stored under elevated temperature and elevated humidity conditions (80° C., 80% humidity) for 48 hours, and gas permeability of membranes was measured under elevated temperature and elevated pressure conditions (130, 150° C., difference in pressure: 100, 300 kPa) by using a mixed gas of hydrogen (H$_2$)/carbon dioxide (CO$_2$)/water (H$_2$O)=40/10/50 (mol %) and gas separation selectivity was compared.

TABLE 3

| | CO$_2$/H$_2$ gas separation selectivity 130° C., 100 kPa | CO$_2$/H$_2$ gas separation selectivity 150° C., 300 kPa |
|---|---|---|
| Example 1 (the present invention) | 103 | 93 |
| Example 2 (the present invention) | 83 | 73 |
| Example 3 (the present invention) | 87 | 65 |
| Example 4 (the present invention) | 72 | 52 |
| Example 5 (the present invention) | 70 | 59 |
| Example 6 (the present invention) | 88 | 72 |
| Example 7 (the present invention) | 105 | 88 |
| Example 8 (the present invention) | 87 | 71 |
| Example 9 (the present invention) | 119 | 97 |
| Example 10 (the present invention) | 72 | 62 |
| Example 11 (the present invention) | 93 | 83 |
| Example 12 (the present invention) | 101 | 90 |
| Example 13 (the present invention) | 79 | 66 |
| Example 14 (the present invention) | 71 | 59 |
| Example 15 (the present invention) | 73 | 53 |
| Example 16 (the present invention) | 72 | 69 |
| Example 17 (the present invention) | 83 | 73 |
| Comparative Example 1 | 31 | 5 |
| Comparative Example 2 | 6 | 1 |
| Comparative Example 3 | 32 | 8 |
| Comparative Example 4 | 3 | 1 |
| Comparative Example 5 | 13 | 2 |
| Comparative Example 6 | Broken membrane | Broken membrane |
| Comparative Example 7 | Broken membrane | Broken membrane |

It can be seen that the gas separation membrane of the present invention has a high amine density per unit molecular weight and a high gas separation selectivity even under high temperature and high pressure conditions since it is fixed.

From these results, the gas separation membrane of the present invention effectively inhibits elution of carriers, in particular, under elevated temperature and elevated humidity conditions and exhibits superior stability. In addition, the gas separation membrane inhibits reduction in separation selectivity under elevated temperature and elevated humidity conditions and exhibits superior stability. The gas separation membrane exhibits superior gas separation selectivity, in particular, superior carbon dioxide permeability and is excellent as a separation membrane of carbon dioxide/methane, carbon dioxide/hydrogen. Through the gas separation membrane and the composite membrane of the present invention, it is possible to provide a superior gas separation method, a gas separation membrane module, and a gas separation and purification apparatus having the gas separation membrane module.

According to the present invention, a gas separation membrane with superior gas permeability and separation selectivity can be produced, and a gas separation membrane with superior gas permeability and separation selectivity can be produced even at a high temperature of 100° C. or higher.

From these results, the present invention provides a gas separation membrane that exhibits superior gas permeability and separation selectivity and has plasticity that can endure bending testing and a method for producing a gas separation membrane with little pinholes. Using the gas separation membrane of the present invention, a superior gas separation method, a gas separation membrane module, and a gas separation and purification apparatus including the gas separation membrane module can be provided.

Industrial Applicability

The gas separation membrane of the present invention provides a gas separation membrane that exhibits superior gas permeability and separation selectivity and plasticity to the extent that it can endure bending testing and has little pinholes and a method for producing a gas separation membrane. Through the gas separation membrane of the present invention, it is possible to provide a superior gas separation method, a gas separation membrane module, and a gas separation and purification apparatus including the gas separation membrane module.

The gas separation membrane of the present invention exhibits superior heat resistance, excellent inhibition of elution of carriers under humidity and excellent stability. In addition, the gas separation membrane has mechanical strength with bending suitability, under high-temperature humidity conditions, inhibits a decrease of separation selectivity and exhibits thermal stability. Furthermore, the gas separation membrane exhibits superior gas separation selectivity, in particular, carbon dioxide permeability, and exerts superior performance as a separation membrane of carbon dioxide/methane, carbon dioxide/hydrogen. Through the gas separation membrane and the composite membrane of the present invention, it is possible to provide a superior gas separation method, a gas separation membrane module, and a gas separation and purification apparatus including the gas separation membrane module.

Although the present invention has been described in detail with reference to specific embodiments, it will be apparent to those skilled in the art that various variations and modifications are possible within the spirit and scope of the present invention.

This application claims the benefit of Japanese Patent Application. No. 2010-076450, filed on Mar. 29, 2010 which is herein incorporated by reference as if fully set forth herein.

The invention claimed is:

1. A gas separation membrane comprising,
a separation-active membrane containing:
a compound represented by the following Formula (I) having a boiling point or a decomposition temperature of 200° C. or higher; and
a cross-linked polymer having at least one repeating unit represented by Formulae (II-1) to (II-3) below:

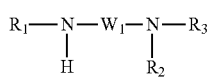

Formula (I)

wherein, in Formula (I),
$R_1$, $R_2$ and $R_3$ represent a hydrogen atom or a substituent;
$W_1$ represents a bivalent linking group;
$R_1$ and $R_2$, $R_1$ and $R_3$ or $R_2$ and $R_3$ may be combined together to form a ring;

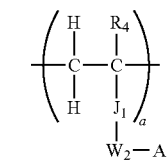

(II-1)

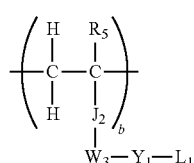

(II-2)

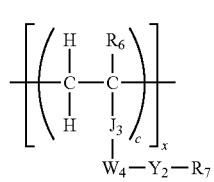

(II-3)

wherein, in each of Formulae (II-1) to (II-3):
each of $R_4$, $R_5$, $R_6$, and $R_7$ independently represents a hydrogen atom or a substituent,
$J_1$, $J_2$ and $J_3$ represent —CO—, —COO—, —CONR$_8$—, —O—, —O—, a methylene group, a phenylene group, or a —C$_6$H$_4$CO—group,
$R_8$ represents a hydrogen atom or a substituent,
A represents a dissociable group, and is at least one selected from a carboxyl group, a sulfonate group, a phosphate group, a hydroxyl group, —CONHSO$_2$—R$_{11}$, —SO$_2$NHCO—R$_{12}$ or —SO$_2$NHSO$_2$—R$_{13}$, provided that $R_{11}$, $R_{12}$ and $R_{13}$ represent a substituent,
$W_2$, $W_3$ and $W_4$ represent a single bond or a bivalent linking group,
$Y_1$ and $Y_2$ represent an alkylene glycol residue structure wherein two hydrogen atoms have been removed from alkylene glycol, and
each of a, b and c independently represents an integer of 1 or more, x represents an integer of 0 or more, and $L_1$ represents an n-valent linking group, and
wherein, in the compound represented by Formula (I), [total molecular weight of a first amine group+total molecular weight of a second amine group]/[molecular weight of Formula (I)] is from 0.3 to 0.84.

2. The gas separation membrane according to claim 1, wherein the cross-linked polymer has at least the repeating unit represented by Formula (II-1), and
a content of the repeating unit represented by Formula (II-1) is 10 to 90 mol% with respect to the total repeating units constituting the cross-linked polymer.

3. The gas separation membrane according to claim 1, wherein the polymer containing the repeating units represented by Formulae (II-1) to (II-3) is formed by a compound represented by following Formulae (III), (IV), (V) or (VI):

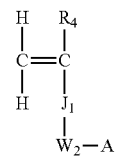

Formula (III)

wherein, in Formula (III), $R_4$, $J_1$, $W_2$ and A of Formula (III) have the same meaning as $R_4$, $J_1$, $W_2$ and A of Formula (II-1):

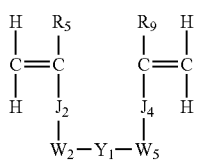

Formula (IV)

wherein, in Formula (IV), $R_5$, $J_2$, $W_3$ and $Y_1$ have the same meaning as $R_5$, $J_2$, $W_3$ and $Y_1$ of Formula (II-2),
$R_9$ represents a hydrogen atom or a substituent,
$J_4$ represents —CO—, —COO—, —CONR$_{10}$—, —O—, —O—, a methylene group, a phenylene group or a —C$_6$H$_4$CO—group,
$R_{10}$ represents a hydrogen atom or a substituent, and
$W_5$ has the same meaning as $W_3$ of Formula (II-2):

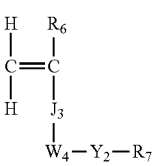

Formula (V)

wherein, in Formula (V), $R_6$, $J_3$, $W_4$, $Y_2$ and $R_7$ of Formula (V) have the same meaning as $R_6$, $J_3$, $W_4$, $Y_2$ and $R_7$ of Formula (II-3):

Formula (VI)

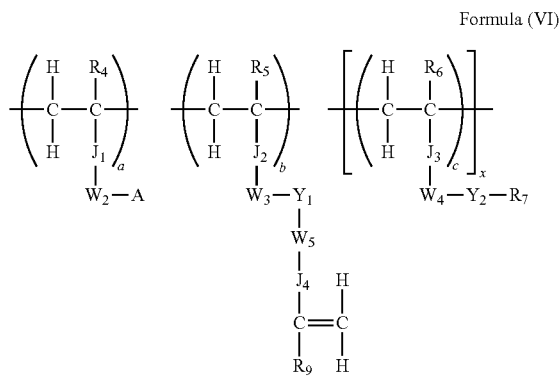

wherein, in Formula (VI), $R_4$, $R_5$, $R_6$, $R_7$, $J_1$, $J_2$, $J_3$, $W_2$, $W_3$, $W_4$, A, a, b, c, x, $Y_1$ and $Y_2$ have the same meaning as $R_4$, $R_5$, $R_6$, $R_7$, $J_1$, $J_2$, $J_3$, $W_2$, $W_3$, $W_4$, A, a, b, c, x, $Y_i$ and $Y_2$ of Formulae (II-1) to (II-3), and $R_9$, $W_5$, and $J_4$ of Formula (VI) have the same meaning as $R_9$, $W_5$, and $J_4$ of Formula (IV).

4. The gas separation membrane according to claim 1, wherein in Formulae (II-1) to (II-3), each of $R_4$, $R_5$, $R_6$ and $R_7$ independently represents a hydrogen atom or an alkyl group, each of $J_1$, $J_2$ and $J_3$ independently represents —CO— group, —COO—group, or —OCO—group, each of $W_2$, $W_3$ and $W_4$ independently represents a single bond, an alkylene group or an alkyleneoxy group, and $L_1$ represents an alkylene group, or an alkyleneoxy group.

5. The gas separation membrane according to claim 1, wherein, in Formula (I)

$W_1$ represents an alkylene group or an arylene group.

6. The gas separation membrane according to claim 1, wherein the compound represented by Formula (I) and the polymer containing repeating units represented by Formulae (II-1) to (II-3) are fixed by covalent bonding.

7. The gas separation membrane according to claim 1, wherein the gas separation membrane further comprises a porous membrane, and the separation-active membrane is disposed at least on the surface of the porous membrane.

8. The gas separation membrane according to claim 1, wherein the gas separation membrane separates at least one acid gas from a mix gas containing the at least one acid gas and at least one non-acid gas.

9. A method for producing the gas separation membrane according to claim 1, comprising, forming the gas separation membrane comprising the polymer containing at least one repeating unit represented by Formulae (II-1) to (II-3) and at least one compound represented by Formula (I) by heat curing.

10. A method for producing the gas separation membrane according to claim 1, comprising, forming the gas separation membrane comprising the polymer containing at least one repeating unit represented by Formulae (II-1) to (II-3) and at least one compound represented by Formula (I) by irradiating an active radiation.

11. A mixed gas separating method comprising, separating at least one acid gas from a mixed gas containing the at least one acid gas and at least one non-acid gas by using the gas separation membrane according to claim 1, wherein the acid gas is at least one selected from carbon dioxide, hydrogen sulfide, carbonyl sulfide, sulfur oxide (SOx), and nitrogen oxide (NOx), and the non-acid gas is at least one selected from hydrogen, methane, nitrogen, and carbon monoxide.

12. The mixed gas separating method according to claim 11, wherein the acid gas is carbon dioxide or hydrogen sulfide.

13. The mixed gas separating method according to claim 11, wherein main components of the mixed gas are carbon dioxide and methane, or carbon dioxide and hydrogen.

14. A gas separation membrane module comprising the gas separation membrane according to claim 1.

15. A gas separation apparatus comprising at least one of the gas separation membrane module according to claim 14.

* * * * *